United States Patent
Stienhans et al.

(10) Patent No.: US 7,913,231 B2
(45) Date of Patent: Mar. 22, 2011

(54) TESTING PATTERN-BASED APPLICATIONS

(75) Inventors: Frank Stienhans, Wiesloch (DE);
Markus Muenkel, Hockenheim (DE);
Joerg Bischof, Muhlhausen (DE);
Martin Kolb, Hambrucken (DE)

(73) Assignee: SAP AG, Walldorf (DE)

( * ) Notice: Subject to any disclaimer, the term of this patent is extended or adjusted under 35 U.S.C. 154(b) by 1003 days.

(21) Appl. No.: 10/843,753

(22) Filed: May 11, 2004

(65) Prior Publication Data
US 2005/0257198 A1 Nov. 17, 2005

(51) Int. Cl.
*G06F 9/44* (2006.01)
*G06F 3/00* (2006.01)

(52) U.S. Cl. ........ 717/125; 717/105; 717/109; 717/113; 715/762

(58) Field of Classification Search .......... 717/124, 717/125
See application file for complete search history.

(56) References Cited

U.S. PATENT DOCUMENTS

| | | | | |
|---|---|---|---|---|
| 5,475,843 | A * | 12/1995 | Halviatti et al. | 717/124 |
| 5,495,571 | A * | 2/1996 | Corrie et al. | 714/38 |
| 5,754,755 | A * | 5/1998 | Smith, Jr. | 714/38 |
| 5,781,720 | A * | 7/1998 | Parker et al. | 714/38 |
| 6,002,871 | A * | 12/1999 | Duggan et al. | 717/135 |
| 6,185,701 | B1 * | 2/2001 | Marullo et al. | 714/38 |
| 6,522,995 | B1 | 2/2003 | Conti et al. | 702/186 |
| 6,741,967 | B1 * | 5/2004 | Wu et al. | 705/10 |
| 6,772,083 | B2 * | 8/2004 | Muller et al. | 702/123 |
| 6,854,089 | B1 * | 2/2005 | Santee et al. | 715/783 |
| 6,898,764 | B2 * | 5/2005 | Kemp | 715/762 |
| 6,948,152 | B2 * | 9/2005 | Dubovsky | 717/124 |
| 6,983,421 | B1 * | 1/2006 | Lahti et al. | 715/763 |
| 7,058,857 | B2 * | 6/2006 | Dallin | 714/38 |
| 7,080,118 | B2 * | 7/2006 | Hildebrand | 709/203 |
| 7,099,893 | B2 * | 8/2006 | Bischof et al. | 717/124 |
| 7,117,411 | B2 * | 10/2006 | McNeely et al. | 714/724 |
| 7,124,401 | B2 * | 10/2006 | Muller et al. | 717/124 |
| 7,143,365 | B2 * | 11/2006 | Gallella | 715/851 |
| 7,165,241 | B2 * | 1/2007 | Manda et al. | 717/124 |
| 7,174,541 | B2 * | 2/2007 | Muller et al. | 717/124 |
| 7,231,606 | B2 * | 6/2007 | Miller et al. | 715/738 |
| 7,249,148 | B2 * | 7/2007 | Ehrich et al. | 707/104.1 |
| 7,305,659 | B2 * | 12/2007 | Muller et al. | 717/127 |
| 7,313,564 | B2 * | 12/2007 | Melamed et al. | 707/101 |
| 7,369,975 | B2 * | 5/2008 | Ramanathan et al. | 703/2 |
| 7,421,683 | B2 * | 9/2008 | Robertson et al. | 717/130 |
| 7,434,203 | B2 * | 10/2008 | Stienhans et al. | 717/120 |
| 7,526,498 | B2 * | 4/2009 | Dubovsky | 1/1 |
| 7,552,424 | B1 * | 6/2009 | Bischof et al. | 717/127 |
| 2002/0026441 | A1 * | 2/2002 | Kutay et al. | 707/5 |

(Continued)

*Primary Examiner* — Tuan Q Dam
*Assistant Examiner* — Marina Lee
(74) *Attorney, Agent, or Firm* — Finnegan, Henderson, Farabow, Garrett & Dunner, L.L.P.

(57) ABSTRACT

Methods and apparatus, including computer program products, implement techniques for testing applications using configurable patterns. A test script is received for a pattern that includes a predefined arrangement of user interface elements and specifies predefined actions that can be performed using the user interface elements. The test script specifies test sequences operable to invoke one or more of the predefined actions that can be performed. A specification of an application is received, where the specification includes configuration data for the pattern. The configuration data specifies associations between one or more of the user interface elements and one or more entities in a back-end system. A generated application-specific test is operable to invoke one or more of the predefined actions according to the test sequences in the test script. The predefined actions use the entities in the back-end system with which the user interface elements are associated.

11 Claims, 13 Drawing Sheets

U.S. PATENT DOCUMENTS

| | | | |
|---|---|---|---|
| 2002/0162059 A1* | 10/2002 | McNeely et al. | 714/703 |
| 2002/0186248 A1* | 12/2002 | Ramanathan et al. | 345/780 |
| 2002/0199025 A1* | 12/2002 | Kutay et al. | 709/250 |
| 2003/0023674 A1* | 1/2003 | Hildebrand | 709/203 |
| 2003/0055836 A1* | 3/2003 | Dubovsky | 707/102 |
| 2003/0231203 A1* | 12/2003 | Gallella | 345/738 |
| 2003/0236775 A1* | 12/2003 | Patterson | 707/3 |
| 2004/0001092 A1* | 1/2004 | Rothwein et al. | 345/763 |
| 2004/0003325 A1* | 1/2004 | Muller et al. | 714/38 |
| 2004/0041827 A1* | 3/2004 | Bischof et al. | 345/704 |
| 2004/0044992 A1* | 3/2004 | Muller et al. | 717/124 |
| 2004/0044993 A1* | 3/2004 | Muller et al. | 717/124 |
| 2004/0107415 A1* | 6/2004 | Melamed et al. | 717/124 |
| 2004/0111727 A1* | 6/2004 | Schwarzbauer et al. | 719/310 |
| 2005/0055667 A1* | 3/2005 | Beringer et al. | 717/108 |
| 2005/0071447 A1* | 3/2005 | Masek et al. | 709/223 |
| 2005/0223360 A1* | 10/2005 | Seeman et al. | 717/124 |
| 2005/0229161 A1* | 10/2005 | Wang et al. | 717/125 |
| 2006/0101404 A1* | 5/2006 | Popp et al. | 717/124 |
| 2007/0089091 A1* | 4/2007 | Larab et al. | 717/124 |
| 2008/0320462 A1* | 12/2008 | Bergman et al. | 717/168 |
| 2009/0217250 A1* | 8/2009 | Grechanik et al. | 717/136 |

* cited by examiner

FIG. 1

TESTING PATTERN-BASED APPLICATIONS

BACKGROUND

The present invention relates to data processing by digital computer, and more particularly to testing applications.

A user interface (UI) facilitates interaction between humans and computers by inviting and responding to user input. User interfaces come in many varieties, and are designed to work in concert with application programs. Application programs, sometimes referred to simply as applications, are programs that an end-user runs to accomplish certain tasks. Applications typically work in conjunction with one or more back-end systems, which store the data to be worked on (e.g., business objects and other business data), as well as logic for manipulating the data (e.g., transactions or other business logic). Examples of back-end systems include database systems, enterprise resource planning (ERP) systems, and customer relationship management (CRM) systems.

A common scenario involving user interfaces is a network application, where a network connects an application program running on a server and one or more user interfaces displayed in client programs running on client devices. The client/server relationship is one in which a server provides services to the client devices. Both the client devices and the server typically have a network interface for accessing networks such as a local area network (LAN), a wide area network (WAN), or the Internet.

In a network environment, a common client device is a personal computer, and a common client program is a Web browser. The client program, which displays a user interface for an application running on a server, enables networked communication between the client device and the server using a data transfer protocol, e.g., the Hypertext Transfer Protocol (HTTP), to exchange files, images, programs, or application data. HTTP is a request/response-type protocol that specifies how the client device and the server communicate with each other. The server may receive a request from the client device using HTTP, respond to the request, and then close the connection. HTTP is a stateless protocol, meaning that each time a client device requests a Web page, the server will respond to the request independently of any previous requests from the client device, and without recording the request.

The information transmitted from the server and intended for display in the client program on the client device may be marked up with Hypertext Markup Language (HTML) code or Extensible Markup Language (XML) code. HTML is a language that is used to describe the structure of a document, such as a Web page. Client programs interpret HTML code to determine how to display the information contained in the page. A user may request a Web page from a server by clicking on a hyperlink or specifying a Uniform Resource Locator (URL) string. A URL can be used to identify the address of a file or Web page that may be accessed on a network. The address identifies the Web server on which the file is stored and the directory in which the file is located. When the server receiving the URL request finds the sought Web page, the server sends the page to the client device so that the client device can use that Web page, for example, by generating a display for a user according to the Web page.

An application usually implements the functionality required to display and execute one or more user interfaces for the application. For this reason, an application is sometimes referred to as a user interface application. In some cases, part of the user interface functionality (e.g., rendering) may be handled by a client program that interacts with the application. Whether or not this can occur depends on the capabilities of the client program.

SUMMARY OF THE INVENTION

In general, in one aspect, the invention provides methods and apparatus, including computer program products, implementing techniques for developing and deploying applications using configurable patterns. These applications include, for example, a user interface (UI) portion that is distributed over a network such as the Internet. The techniques include receiving a test script for a pattern, receiving a specification of an application, and generating an application-specific test. The pattern includes a predefined arrangement of user interface elements and specifies predefined actions that can be performed using the user interface elements. The test script specifies test sequences operable to invoke one or more of the predefined actions that can be performed using the user interface elements. The specification of the application includes configuration data for the pattern, where the configuration data specifies associations between one or more of the user interface elements and one or more entities in a back-end system. The application-specific test is operable to invoke one or more of the predefined actions according to the test sequences in the test script, the predefined actions using the entities in the back-end system with which the user interface elements are associated.

Advantageous implementations of the invention include one or more of the following features. The application can be tested by executing the application-specific test. The pattern can include one or more tested patterns. Receiving the test script can include receiving one or more distinct test scripts, where each distinct test script corresponds to one of the nested patterns. Receiving the specification of the application can include receiving distinct configuration data for each nested pattern. The application specific tests can be used to test each nested pattern as configured by the distinct configuration data according to the distinct test script corresponding to the nested pattern. The test script can include test data, and generating the application specific test can include selecting a portion of the test data based on the configuration data. The techniques can further include receiving a specification of a second application, and generating a second application specific test. The specification of the second application can include distinct configuration data for the pattern, where the distinct configuration data specifies associations between one or more of the user interface elements and one or more entities in a second back-end system. The second application specific test is operable to invoke one or more of the predefined actions according to the test sequences in the test script, where the predefined actions use the entities in the second back-end system with which the user interface elements are associated.

The invention can be implemented to realize one or more of the following advantages. A pattern test script is developed for a pattern, and the pattern test script can be used to test multiple applications developed using that pattern. The pattern test script can be used to generate application-specific tests for pattern applications using the corresponding pattern configurations for each application. Only one pattern test script is required to be developed for each pattern, instead of one test script for each pattern application. A pattern developer can develop the pattern test script, and pattern application developers can use the pattern test script to test applications that use the pattern. One implementation of the invention provides all of the above advantages.

The details of one or more implementations of the invention are set forth in the accompanying drawings and the description below. Further features, aspects, and advantages of the invention will become apparent from the description, the drawings, and the claims.

BRIEF DESCRIPTION OF THE DRAWINGS

FIG. 1 is a screenshot of a user interface.

Like reference numbers and designations in the various drawings indicate like elements.

DETAILED DESCRIPTION

Overview of UI Patterns

Figure 1:
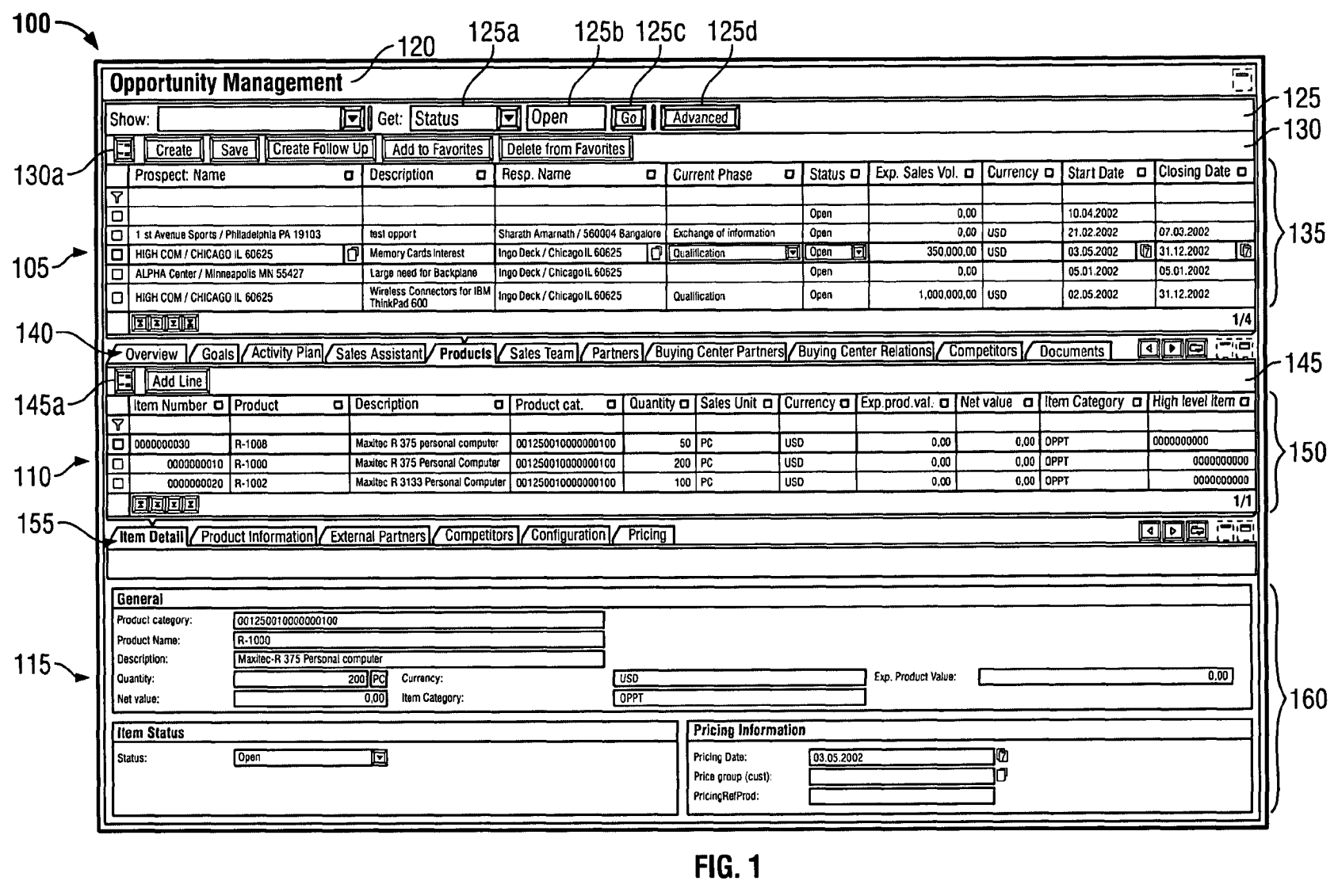
Figure 2:
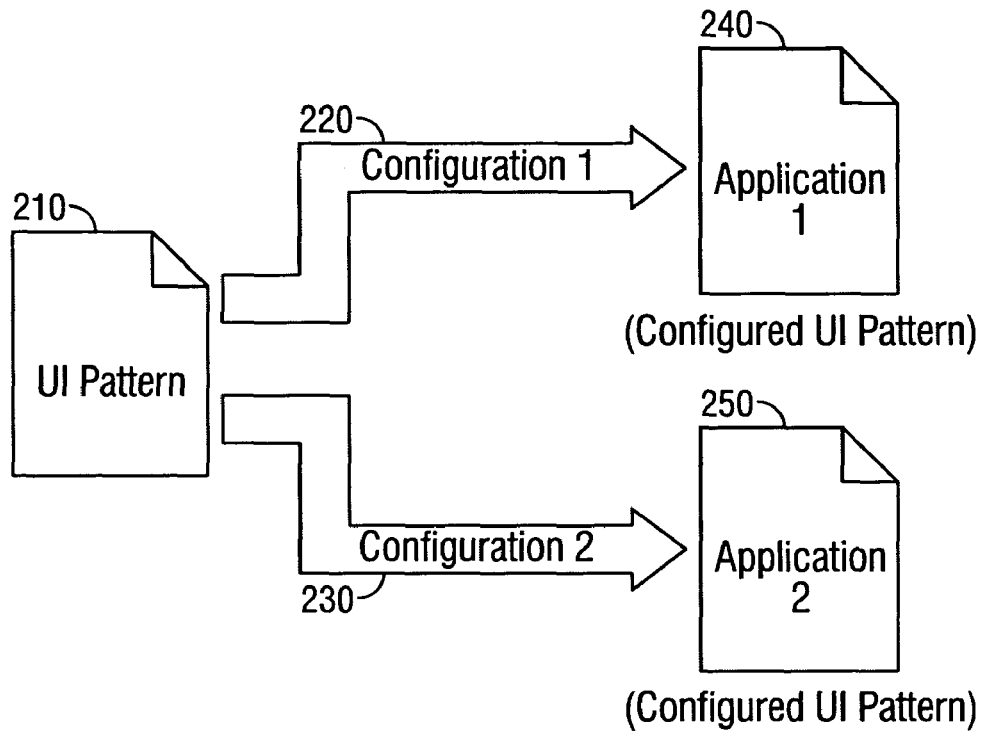
FIG. 2 is a block diagram illustrating the configuration of a UI pattern.

FIG. 1 illustrates a screenshot of a user interface 100. User interfaces typically contain various UI elements, including controls (e.g., drop down element 125a, text box element 125b, or button element 125c) and data elements (e.g., content area 135), arranged into application screens or views. The design of a user interface, including the layout of the UI elements and the navigation between the UI elements and between the views, is usually left up to the application developer. Thus, if the task of developing the same application is given to a number of application developers, each developer may design a different user interface for that application. Although each version of the application implements the same functionality, the user interfaces may be significantly different from each other.

A more constrained and structured approach to developing user interfaces is to build them using user interface patterns. A UI pattern (sometimes referred to simply as a pattern) is a configurable, reusable user interface unit designed to let users accomplish a specific but generically-defined task, such as searching for business objects, and editing the objects that are retrieved. Generally, each UI pattern has a specific semantic meaning and defined interaction behavior. In one implementation, each UI pattern includes a predefined arrangement of UI elements. Using UI patterns promotes uniform design throughout an application or group of applications because similar tasks are represented and handled in the same manner. For example, a user can always search in the same way, whether searching for a sales order, a business partner, or a product.

UI patterns can be defined at various levels, and can be nested within each other, thus creating hierarchies of patterns. At the top level of the hierarchy, a pattern can act as a "floor plan" for a user interface that is designed to help end-users complete a specific business process. The floor plan defines the user interface by specifying an overall screen layout for the user interface and managing and orchestrating any nested patterns.

One example of an important business process is working with business documents. A business document (e.g., a sales order or an invoice) is a high-level business object that can contain references to other business objects (e.g., objects corresponding to the items in a sales order and to the customer that placed the sales order). The process of working with business documents typically involves finding an existing business document or creating a new business document, and then displaying and editing the document. To help a user accomplish these tasks, an application should include a user interface that assists the user in locating the business document to be edited, and then presents the logical parts of the business document (e.g., the referenced objects that contain the customer data and the sales order items) in a clear and structured manner. The user interface should display the relevant data in an appropriate format for the given context (e.g., in a table, a form, or a chart). The user interface should also provide input help where applicable, and supply application documentation if needed. After the user has finished editing the business document (including objects referenced by the document), the user interface should also help the user carry out post-editing tasks, such as printing out the business document, and performing document lifecycle actions (e.g., saving, deleting, creating, or updating).

An example floor plan for such a user interface can specify that an application screen is to be divided into three sections, with a top section for searching for and selecting business objects, a middle section for showing the details of an object selected in the top section, and a bottom section for showing the details of a sub-object of the object in the middle section.

More detailed, lower-level patterns can be used for each of the sections specified in a floor plan. For example, an object identification pattern (OIP) can be used for the top section in the floor plan specified above. An OIP pattern (an example of which is provided below), can specify, for instance, that a section of the screen is to include a search bar with various text entry fields and buttons at the top, and an area below the search bar where content (i.e., the content returned as a result of a search) is to be displayed.

This process can continue with the definition and hierarchical nesting of even lower-level patterns. For example, the OIP pattern above can specify that the content display area is to include a table control for displaying the results of a search. The table control can be a complex control that lets users perform tasks such as selecting and sorting rows in the table, and editing entries directly in the table. In this scenario, the table control itself can be thought of as a low-level pattern.

The user interface 100 shown in FIG. 1 illustrates an example of a pattern-based user interface. The user interface 100 has a floor plan that includes an object identification pattern (OIP) 105 and two object data patterns (ODPs) 110 and 115. As described below, object identification pattern 105 and object data patterns 110 and 115 are made up of embedded lower-level patterns, such as a data view, a form pane, a list pane, or a chart pane. Each embedded pattern can include further embedded patterns, including, for example, tool bars, tables, tab strips, and other UI pattern elements.

Object identification pattern 105 is a pattern that provides an interface for searching for objects (using zero or more selected criteria), and for displaying objects found to meet those criteria. Like the floor plan pattern, OIP 105 is itself a pattern with several embedded elements. Object identification pattern 105 includes a title bar 120, a search bar 125, a tool bar 130, and a content area 135.

Title bar 120 orients the user. Search bar 125 enables the user to enter zero or more search criteria to locate objects of interest. For example, search bar 125 includes a drop down element 125*a* that lists the fields for which the user can enter a search term. Drop down element 125*a* illustrated in FIG. 1 shows that the user has selected the field "Status" for searching. Search bar 125 also includes a text box element 125*b* that allows a user to enter a search term to identify the objects of interest. Text box element 125*b* illustrated in FIG. 1 shows that the user has entered "Open" as the value to find in the "Status" field. Search bar 125 also includes a "Go" button element 125*c* that initiates the search based on user input in elements 125*a* and 125*b*. With the word "Get" located in front of drop down element 125*a*, search bar 125 reads "Get Status Open Go", which provides a reusable and intuitively understandable mechanism for initiating user searches.

Search bar 125 also includes an "Advanced" button element 125*d* that allows a user to initiate an advanced search. Upon pushing button 125*d*, a form pane is rendered between search bar 125 and tool bar 130. The form pane can include, for example, each of the fields that are in drop down element 125*a*, and a text box besides each field. Thus, the user can enter search terms for multiple fields to create more focused searches, thereby limiting the number of objects that appear in content area 135.

Tool bar 130 provides functions that the user can perform on the objects displayed in the content area 135, such as create, save, and add to and delete from the user's list of favorite objects. Tool bar 130 also includes a toggle control 130*a* that allows a user to toggle the layout of content area 135 between different types of panes that provide different representations of the objects retrieved by a search. For example, a list pane displays a tabular representation of the objects (as illustrated in FIG. 1). A form pane displays the object that is currently selected, with each field in the object having a control (e.g., a text box, a pull down menu, or a check box) to enable a user to change data associated with that field. As another example, a chart pane can display a graphical representation of the retrieved data. Panes can be developed to meet specific needs, and can be integrated as low-level patterns into high-level patterns such as OIPs and ODPs.

As indicated above, content area 135 displays those objects that meet the search criteria specified by the user. Selecting an object in content area 135 determines what is displayed in object data pattern (ODP) 110. ODP 110 is a pattern that displays detail data associated with the selected object from content area 135. ODP 110 includes a tab bar 140, a tool bar 145, and a content area 150. Tab bar 140 selects the type of data that is displayed in content area 150. FIG. 1 depicts the "Products" tab as having been selected, so the data in content area 150 corresponds to product data (e.g., a list of products with item numbers, product descriptions, quantities, and the like) associated with the object selected in content area 135. Tool bar 145 includes a toggle button 145*a* that allows a user to toggle the layout of content area 150 between a list pane (as currently illustrated in FIG. 1) and another type of pane (e.g., a form pane or a chart pane).

Selecting an object in content area 150 determines what is displayed in object data pattern (ODP) 115. ODP 115 is a pattern that displays detail data associated with the selected object from content area 150. ODP 115 includes a tab bar 155 and a content area 160. Tab bar 155 selects the type of data that is displayed in content area 160. FIG. 1 depicts the "Item Detail" tab as selected, so the data in content area 160 corresponds to item detail data (e.g., a form pane with item details such as product description, quantity, net value, status, and the like) associated with the object selected in content area 150.

As an example of a different floor plan, ODP 115 can be replaced with a guided data entry pattern (GDP). A GDP is a pattern that guides the user through a sequence of steps in a task. A GDP can contain a step bar and a data entry area, similar to tab strip 155 and content area 160 of ODP 115. The step bar of the GDP however, represents the steps of the guided process. For example, using tab strip 155 for illustration, the "Item Detail" tab would be a "Step 1" tab, the "Product Information" tab would be a "Step 2" tab and so on. In execution, the GDP would start on the "Step 1" tab and display in the data entry area the fields that the user must enter for the first step of the process. When the user clicks on the "Step 2" tab, the data entry area would change for the second step of the process. In one implementation of a GDP, the user is not permitted to perform steps out of sequence (e.g., to go from the "Step 1" tab to the "Step 3" tab), or to proceed to the next step until the current step is completed (e.g., the user is not allowed to select a subsequent tab or enter data for a subsequent tab until data entry for the current tab is complete). In another implementation, whether or not the user is allowed to perform steps out of sequence is left as a choice for the application developer to specify as part of a configuration for a GDP.

The UI patterns described above and in the remainder of this application (e.g., OIPs, ODPs, and GDPs) are meant to serve only as illustrative, concrete examples of patterns. Patterns can be created to let users accomplish any generically-defined task, and the concepts and techniques described in this application apply to and can be used with all such patterns, and are not to be restricted to the example patterns discussed herein.

Configuring UI Patterns

User interface 100 of FIG. 1 illustrates a particular application that is based on the patterns described above. Such an application will be referred to as a pattern-based application, a pattern application, or simply an application. As explained above, UI patterns are reusable user interface units designed for generic tasks—for example, an OIP pattern is designed for the task of searching for and selecting business objects stored in a back-end system (e.g., a database). In order to create a concrete user interface, e.g., user interface 100 with OIP 105, UI patterns need to be configured. FIG. 2 illustrates an example in which a UI pattern 210 is configured (shown using arrows 220 and 230) to create two UI applications 240 and 250. Configuration one 220 is used to create application one 240, and configuration two 230 is used to create application two 250.

Configuration is the process through which a UI pattern is developed into an actual user interface (or portion thereof) for an actual application. For illustrative purposes, this might be compared to instantiating an object of a specified class—the UI pattern (comparable to a class) specifies the general properties of a portion of a user interface, and a configured pattern (comparable to an instantiated object) specifies the actual properties of the portion of the user interface for an actual application. UI pattern 210 represents the general properties of the UI portion—for example, that a table is included in that UI portion, and that the location of the table is under a title bar. Configuration one 220 represents the process of specifying the specifics of the UI portion (for example, the specific columns that will be included in the table when the table is rendered), so as to create an application (for example, application one 240) that displays a UI with a table under the title bar with specific columns defined by configuration one 220. Similarly, application two 250 displays a table, but with specific columns as defined by configuration two 230.

A configuration can also specify what back-end systems and data are to be used for a pattern. For example, configuration one 220 can specify a particular back-end system (e.g., a local or remote database system) and a particular service to use to access the data on that back-end system that is to be displayed in the table in the UI pattern 210. Examples of services that can be used to access a host system include web services, Enterprise Java Beans (EJBs), Business Application Programming Interfaces (BAPIs) developed by SAP AG of Walldorf (Baden), Germany (SAP), and other business logic services.

As another example of a configuration, an OIP might specify that a user interface is to include a search bar at the top of the interface and a content area below the search bar. The search bar is to include a drop down box for selecting a search field, a text box for entering a query string, and a "Go" button for executing searches. Configuring such a pattern is the process of providing specifics for the pattern for an actual application. For example, to configure the OIP pattern, an application developer can specify the search fields to be included in the drop down box, the query to run when the "Go" button is pressed, the back-end system in which to run the query (i.e., the system where the actual data is located), and the columns from the returned results to display in the content area.

In some implementations, a UI pattern can have a number of predefined layouts (e.g., a grid layout and a flow layout), and the application developer can decide which of the available layouts to use as part of the configuration process. Moreover, each layout can be further configurable, providing the application developer with further configuration options (e.g., an option to create groupings of fields or other elements). In yet other implementations, a pattern can be defined to have a fully configurable layout, giving the application developer complete freedom to modify the arrangement of the elements in the pattern (e.g., by using a graphical configuration tool to specify screen positions for each element in the patter).

Thus, the degree to which each UI pattern is configurable can vary. For example, the degree to which the arrangement of elements in a pattern can be configured can vary across a spectrum—for some patterns, the arrangement of UI elements can be fully predefined, leaving no configuration options for the application developer; for some patterns, the application developer can be given an option to choose between a handful of predefined arrangements; and for other patterns, the application developer can be given full freedom to define a custom arrangement of elements.

Other pattern properties can also be partially or fully configurable. For example, a developer can be given no options or a few options regarding the actions to be performed by a UI element in a pattern. Or the developer can be allowed to define and associate a custom action with an element in a pattern.

As can be seen from the prior discussion, the term "configuration" can be used in multiple ways. First, "configuration" is the process by which a pattern is developed into a concrete user interface (or portion thereof) for a concrete application. A "configuration" also refers to the data that is produced as a result of the configuration process—i.e., it is the set of data that defines a concrete user interface based on a pattern. Finally, "configuration" can also be used to refer to the set of options provided during the configuration process. As used in this manner, a selected option in a configuration produces a defined item of configuration data.

The use of patterns to develop applications creates two potential levels of re-use. First of all, patterns serve as re-usable building blocks for building user interfaces. For example, an OIP can be used to create two different user interfaces—a first configuration can define a user interface for searching for business objects related to customers (customer objects), and a second configuration can define a second user interface for searching for business objects related to inventory (inventory objects).

In addition, configurations can be reused, meaning that the configurations themselves can serve as re-usable building blocks for building applications. Thus, in the example above, the OIP configuration that defines a user interface for searching for customer objects can be integrated and used in two different applications (e.g., a customer relationship management application and a billing application).

The configuration of a UI pattern can be done either manually (e.g., with a text editor), or through the use of a configuration application. A configuration application facilitates the process of configuring a UI pattern. In one implementation, the configuration application displays multiple configuration options for the application developer to select. As the selections are made, the configuration application displays a WYSIWYG representation of the resulting configured user interface, thereby allowing the application developer to preview his selections and make any necessary modifications. The configuration options can include lists of the available back-end systems, queries, query fields, and query results.

Once the application developer has finished selecting the configuration options, the selections are stored as configuration data for the UI pattern. The configuration data can include associations between one or more of the UI elements in the UI pattern and one or more of the back-end entities to be used with the UI pattern. As an example, configuration data for the OIP described above can include a specification of the back-end system to be used, the query to be run in the back-end system, the query fields to show in the drop down box, and the result fields to display in the content area.

The configuration data can also include customization data for one or more of the UI elements in the UI pattern. The customization data can specify local changes to the business objects associated with the UI elements. For example, a drop-down menu item might be associated with a back-end query field called "UID". The customization data may specify that the "UID" field should be displayed using a more user-friendly label, for example, "reference number". Such a customization applies only to the particular UI element in the particular application being configured, and does not affect how the business object is represented in the back-end system or how the business object is represented by other UI elements in other applications that use the same UI pattern.

The configuration data can be stored in a configuration repository. In one implementation, the configuration data is stored in one or more files. Such files can be nested to reflect a hierarchical arrangement of further UI patterns. The configuration data can then be read by a pattern component, which generates the implementation of the actual user interface for the application based on the configuration data.

Figure 3:
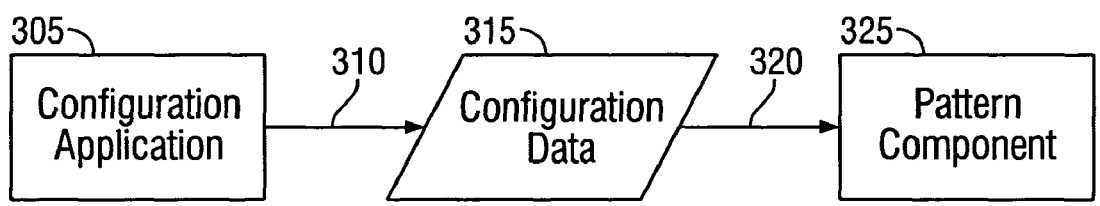
FIG. 3 is a block diagram illustrating the use of a configuration application.

FIG. 3. illustrates the use of a configuration application 305 to create 310 configuration data 315, which is combined 320 with a UI pattern component 325 to produce a pattern-based application. The configuration application 305 generates configuration data 315 that is specific to pattern component 325. That is, the configuration application 305 can ensure that a configuration schema for pattern component 325 is followed.

The generation of a pattern-based application based on a configuration can be done either immediately after the configuration has been completed, or at a subsequent point in time, such as when the pattern-based application is executed.

For example, in the scenario described above where a configuration application produces configuration data for a pattern component, the pattern component can read the configuration data and generate the pattern-based application immediately after the configuration data has been produced. This is referred to as a design-time generation of a pattern-based application, since the generation occurs when the configuration is produced (i.e., when the configured pattern or application is designed).

Alternatively, the pattern component can read the configuration data and generate the implementation of the corresponding pattern-based application when the pattern-based application is executed by an end-user. This is referred to as a run-time or on-demand generation of a pattern-based application. In one implementation, the choice of whether the implementation of a pattern should be generated at design time or at run time is left as an option for the application developer. The use of configuration data to generate an implementation of a pattern (e.g., a configured pattern component) is described in more detail below.

Application Development Framework

Figure 5:
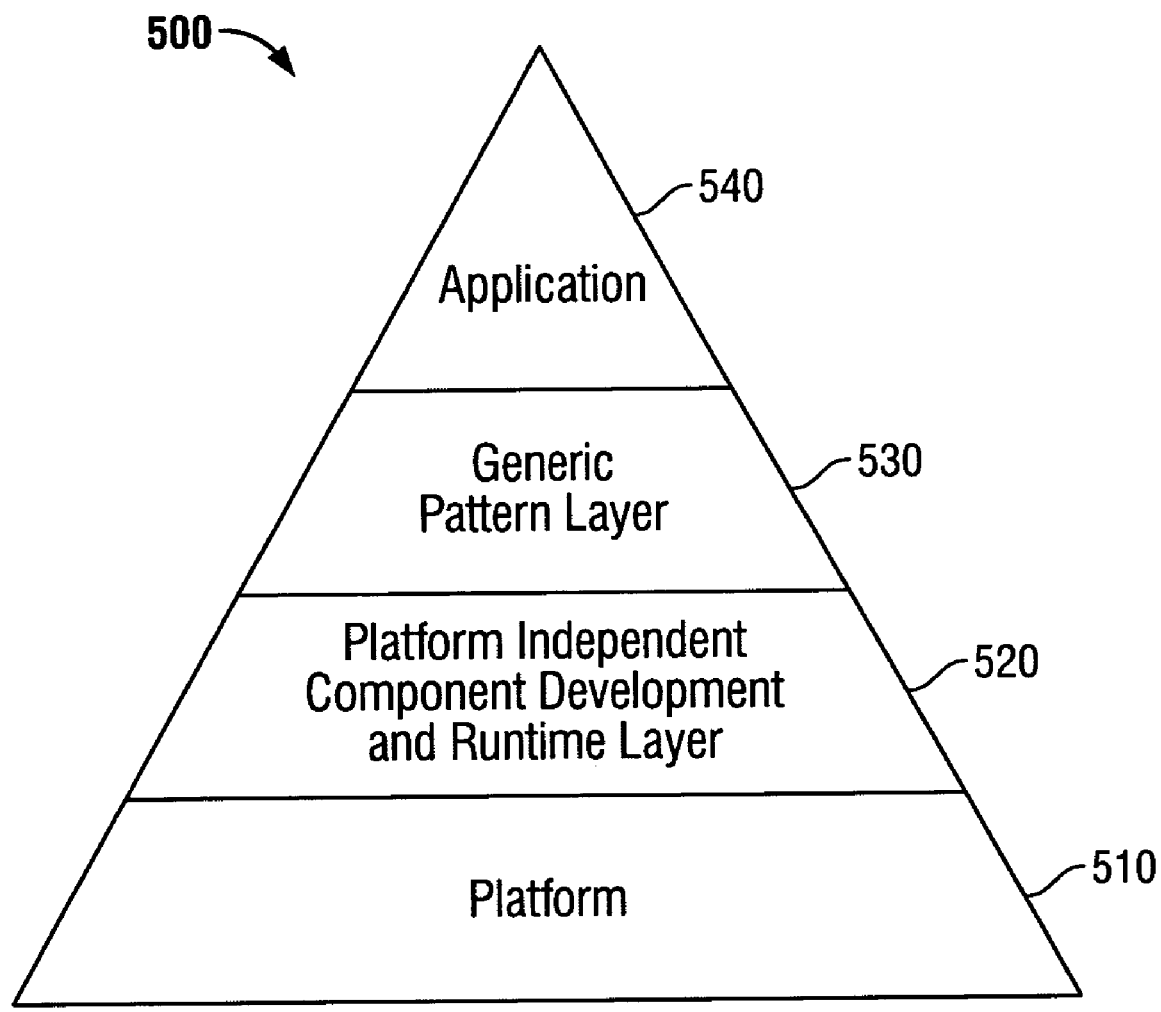
FIG. 5 is a block diagram of a framework for simplifying application development.

FIG. 5. illustrates an example framework 500 for application development based on the configuration of patterns. At the base, framework 500 includes a platform layer 510 on which applications execute. Two example platform layers 510 are the Java 2 Platform, Enterprise Edition (J2EE), manufactured by Sun Microsystems, Inc. of Santa Clara, Calif. and the Advanced Business Application Programming (ABAP)-based platform manufactured by SAP. The platform layer is generally chosen (or already established) by the enterprise that executes the applications.

To enable applications to execute on different platform layers 510, framework 500 includes a platform independent component development and run-time layer 520. In this environment, applications can be developed using modules known as components. Components can be stored in a component repository and reused—that is, each component can have more than one instance, where the component instances are used in multiple applications, or multiple times in the same application. Components can be embedded (nested) within other components, and they can have zero or more visual representations. In one implementation, each component provides three separate interfaces—a programming interface, a data binding interface, and a visual interface. The programming interface can be used by an embedding entity (a component embedder—e.g., a higher level component, or an application) to interact with the embedded component. The visual interface can be used by a component embedder to access and use the visual representations of the embedded component (for example, to form the component embedder's own visual representation). The data binding interface can be used by the component embedder to exchange data with the embedded component.

An example platform independent component development and runtime layer 520 is the Web Dynpro environment manufactured by SAP. The Web Dynpro environment is based on the Web Dynpro programming model, which conforms to the model-view-controller programming paradigm described below with respect to FIGS. 6A and 6B. In one implementation, platform independent layer 520 provides a framework for defining application components in a declarative and/or graphical manner, without needing to program the components for a particular platform layer 510. Platform independent layer 520 also provides interfaces, tools, services, and other features to enable the application components to execute on a specific platform layer 510. In another implementation, platform independent layer 520 additionally provides functionality to enable application components to render user interfaces on a number of different clients, with platform independent layer 520 performing the appropriate transformations for specific clients.

Building on top of platform independent layer 520, framework 500 includes a pattern layer 530 with one or more generic UI patterns. Each UI pattern is generic because it defines a particular pattern (e.g., a floor plan pattern, an OIP, an ODP, a GDP, and the like), but not the specific content that is included for a specific application that uses that pattern. The specific content for a specific application is created by configuring the pattern as described above.

In one implementation, each UI pattern includes a configuration application and a pattern component. The configuration application and the pattern component for each UI pattern can be applications that are developed and executed on the platform independent layer 520 shown in FIG. 5. Using this approach, the configuration application and the pattern component for each UI pattern can take advantage of the features offered by platform independent layer 520, including, for example, platform independence, client independence, and various functionality offered by platform independent layer 520, such as automatic input help and validation based on declared data types.

Figure 4A:
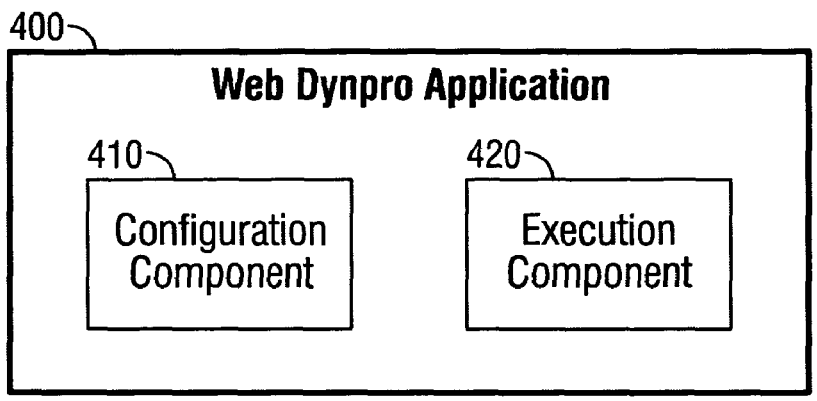
FIGS. 4A-4C illustrate block diagrams of three implementations of a UI pattern.
Figure 4B:
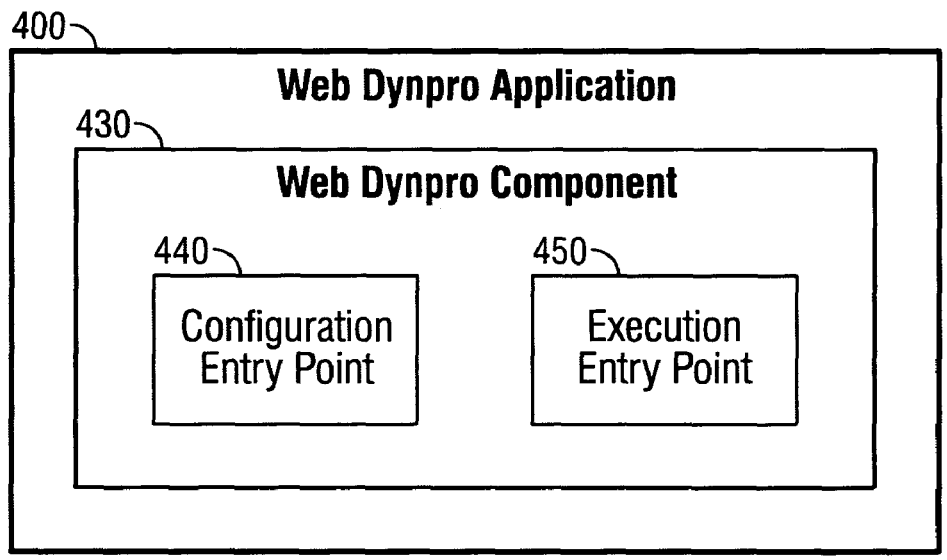

In one implementation, each UI pattern is implemented as a single Web Dynpro application 400, illustrated in FIG. 4A. The single Web Dynpro application has two components, a configuration component 410 that performs the functionality of the configuration application, and an execution component 420 that performs the functionality of the pattern component. Alternatively, as illustrated in FIG. 4B, the Web Dynpro application 400 can be developed using a single component 430 with two entry points—one for configuration 440 and one for execution 450. The application 400 uses a different entry point depending on whether it is being used for configuration or execution of the pattern.

Figure 4C:
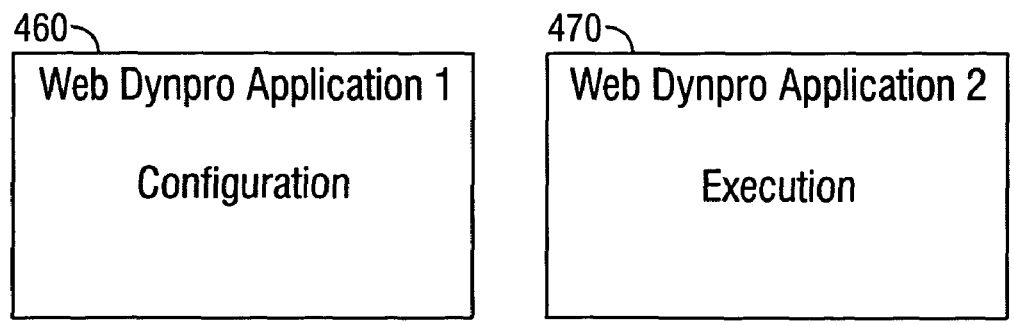

Yet another alternative, illustrated in FIG. 4C, is for each UI pattern to be implemented as two separate Web Dynpro applications—one for configuration 460 and one for execution 470. Each of the two Web Dynpro applications is developed using a separate component—i.e., the configuration application 460 includes a configuration component, and the execution application 470 includes a pattern or execution component.

Referring back to FIG. 5, the top layer, application layer 540, contains the actual applications to be run by end-users. In this framework, an end-user application is made up of one or more configured UI patterns. In an implementation where each UI pattern includes a pattern component, an end-user application is made up of one or more configured pattern components (e.g., pattern components and their corresponding configurations). An end-user application can be stored in a configuration repository in the form of configuration data and references to the associated pattern components.

Framework 500 thus enables application developers to develop applications by configuring generic pattern components into components for specific applications (e.g., components that display the actual fields illustrated in UI 100). In one implementation, as described in more detail below, configuration data (e.g., data in a configuration repository or in one or more configuration files) is used to configure a generic pattern component into a component for a specific application. The configuration data can be defined through the use of declarative and/or graphical tools that are included, for example, in a configuration application, thus dramatically simplifying the task of developing applications. If, for example, the configuration application has access to a meta data repository that specifies the fields available for a particular back-end system for which an application is being developed, the application developer can develop an application (e.g., create a configuration) by simply choosing the fields in the meta data repository to be included (e.g., displayed) in the application.

Framework 500 can be thought of as creating a role-based programming methodology, where layers 510, 520, 530, and 540 correspond to different roles for different developers. Framework 500 is illustrated as a triangle to represent graphically that complexity and difficulty decrease for each role as one moves from the base layer to the top layer. Thus, a developer who is responsible for building and maintaining the platform independent layer 520 has the most complex and difficult job, and must be familiar with the programming languages, tools, and other intricacies of one or more platform layers 510. A developer who is responsible for building and maintaining UI patterns (e.g., configuration applications and pattern components) has a simpler job, as he or she can take advantage of the features and functionality offered by the platform independent layer 520, as described above. Finally an application developer (a developer who is responsible for developing end-user applications) has the least complex job, as he or she can create applications simply by configuring predefined UI patterns. Where the configuration process is as simple as using a configuration application to choose the desired fields from a set of available fields, the application developer may not need to have any advanced programming skills.

Example OIP Pattern Component

Figure 6A:
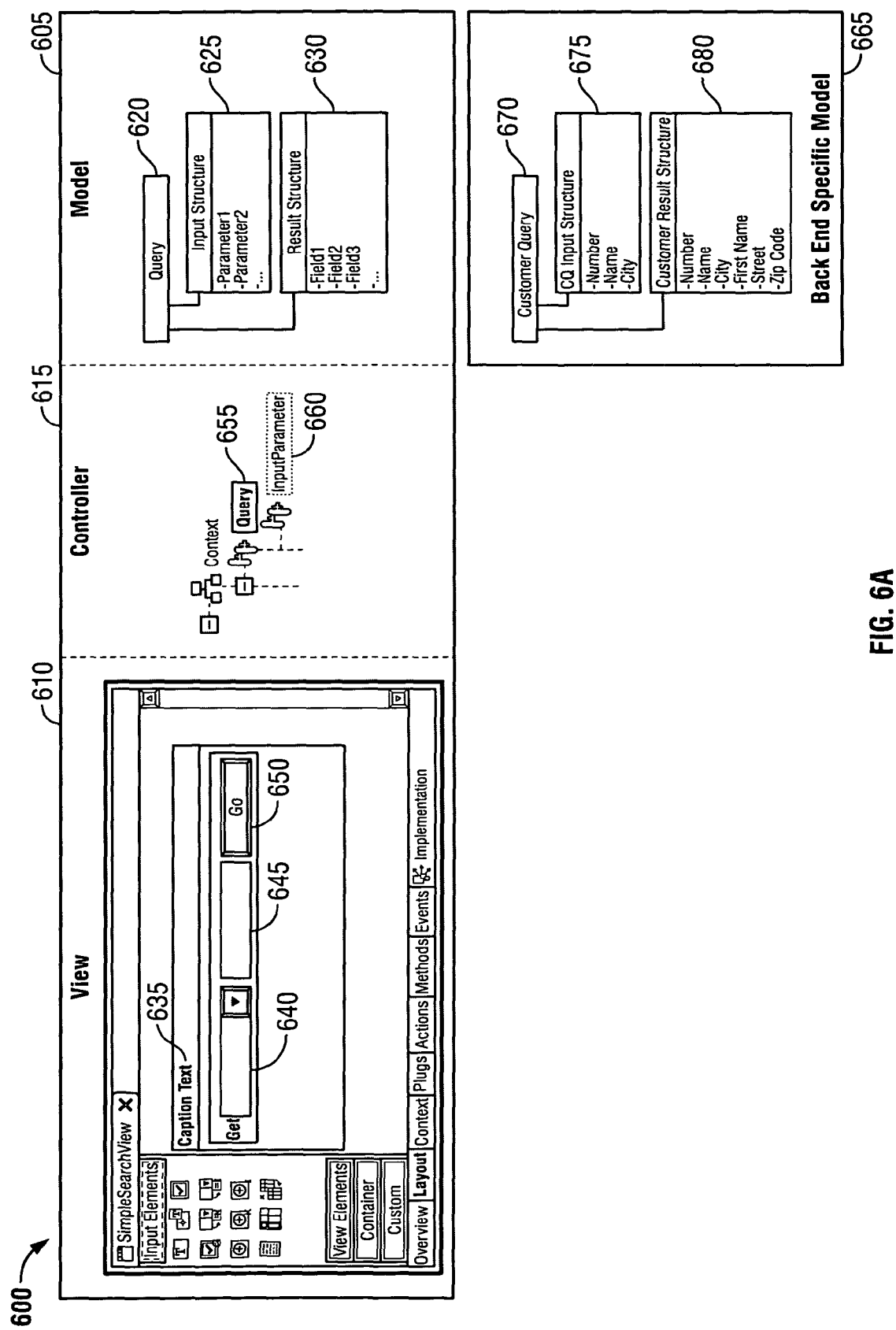
FIGS. 6A-6B are block diagrams of a configurable pattern component for a search pattern.

As described above, an application can be built by configuring a generic pattern component. FIG. 6A illustrates an example of a generic pattern component 600 for an OIP. Component 600 follows a model-view-controller (MVC) paradigm, and as such includes a model 605, a view 610, and a controller 615. In the MVC paradigm, models generally implement application logic. Each model can have multiple views, where each view displays information about the model to a user. A controller of the application receives events, for example, raised by a user interacting with a view to manipulate the model. A model can have multiple controllers. Controllers can relate to zero or more views. Controllers can also relate to an application in general, or to one or more application parts or components. Models and controllers typically include application code. When changes occur in a model, the model can update its views. Data binding can be used for data transport between a view and its model or controller. For example, a table view can be defined to display data from a corresponding table that is stored in a model or controller. The table view is thus bound to the table, indicating that the table is to be used as the data source for the table view. As another example, the table view can be replaced by a further view, such as a linked list, that binds against the same table. In this case, the further view can display the table data without requiring any changes to be made to the controller or the model.

As explained earlier, an OIP provides an interface to search for and select objects. Accordingly, the model 605 in the OIP component 600 includes a query 620 (e.g., a query class). Because an OIP is a generic UI pattern, query 620 represents a generic query. In one implementation, query 620 includes an input structure 625 of n parameters allowed for queries, and a result structure 630 of m fields returned for each object meeting the search criteria.

View 610 of component 600 defines a user interface with a generic arrangement of UI elements for performing searches. View 610 includes a title bar 635 that displays a caption to orient the user. View 610 also includes a search bar with a drop down element 640 in which the user can select from the available input parameters selected from the input structure 625. The search bar also includes a text entry box 645 in which the user can enter a match criterion for a search, and a "Go" button 650 to initiate the search.

Controller 615 of component 600 binds the UI elements of view 610 (e.g., UI elements 635, 640, and 645) to data elements in a storage area (referred to as a context) that is associated with the controller 615. The context is a structured storage area with hierarchically arranged nodes and attributes. The context associated with the controller 615 includes a query node 655 that includes an input structure 660. The input structure 660 in the controller context corresponds to the input structure 625 in the model 605, and can include up to the n parameters included in the input structure 625.

When the OIP pattern component 600 executes, the component receives configuration data (e.g., from a configuration repository or one or more configuration files), and, based on that configuration data, generates child elements for the input structure context node 660, and binds those elements to elements in the view 610 and the model 605.

As an example, consider an application that allows end-users to search for and retrieve information about a company's customers. To create such an application, a developer can configure an OIP pattern to use a specific back-end system with customer information, e.g., a system represented by back-end specific model 665. Back-end specific model 665 indicates that the back-end system in this example can execute a query called customer query 670 that takes up to three input parameters (a customer number, customer name, and customer city, as specified in the customer query input structure 675), and returns records with six fields (the six fields specified in the customer result structure 680). In an example configuration, an application developer might specify that users should be able to run searches based on any of the three available input parameters (i.e., that all three of the input parameters in the customer query input structure 675 should be listed in the drop down element 640). The developer might further specify that the content display area below the search bar in view 610 should display all six of the available return fields listed in customer result structure 680.

Figure 6B:
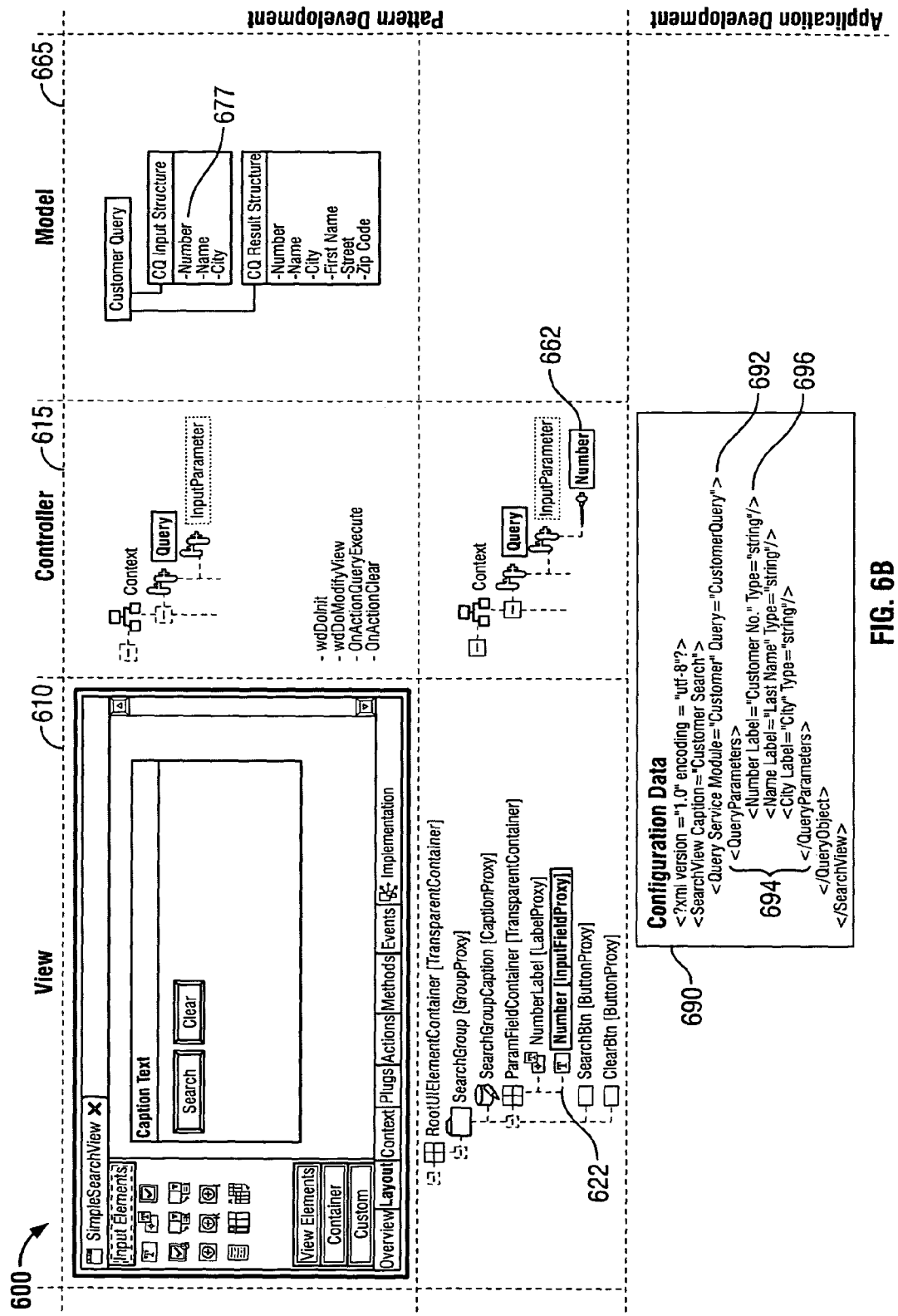

The preceding configuration can be specified as configuration data, an example of which is shown as XML data 690 in FIG. 6B. The XML configuration data 690, which is discussed in more detail below, can be used to generate the execution-related entities in the pattern component 600 that are required to implement the specified configuration for the OIP pattern. For example, in an implementation in which applications (including pattern components) are structured according to the Web Dynpro programming model, several types of entities can be generated based on the configuration data, including UI elements (e.g., controls in views), data structures (e.g., context entities such as nodes and attributes), and bindings (e.g., context bindings, which serve to couple UI elements and context entities, and model bindings, which serve to couple context entities and model entities).

As a specific example, the XML configuration data 690 includes a first section of data 692 that indicates that the pattern component 600 is to execute searches using a query object named "CustomerQuery" in a back-end service module named "Customer." A service module is a grouping of functionality in a back-end system; the functionality can include business functionality that defines business objects or other entities (e.g., customers), and that provides access to such entities (e.g., through query objects such as CustomerQuery). In this example, the CustomerQuery query object is represented by the customer query object 670 in the model 665.

As discussed above, the application developer has chosen a configuration in which end-users are to be able to execute searches using any of the three available input parameters in the customer query object 670. This selection of input parameters is indicated in a second section of configuration data 694, which lists all three parameters (Number, Name, and City) from the input structure 675 in the customer query object 670.

In particular, the Number parameter 677 in the input structure 675 is listed in the section of configuration data 696. The Number parameter 677 represents customer numbers, and its selection as an available search parameter means that application end-users are to be able to search for customers by providing a customer number (as well as possible additional parameters). To enable such searches, a number of execution-related entities are added to the pattern component 600, including a Number UI element 622 and a Number context attribute 662.

The Number UI element 622 is added to the view 610 so that an end-user can type in a customer number in that UI element. Though not shown in the preview of the view 610 in FIG. 6B, the UI element 622 can be displayed and enabled in the view 610, for example, when an end-user selects an "advanced search" option that exposes a form with multiple fields in which the end-user can enter search criteria. Based on the configuration data 696, the UI element 622 is given the label "Customer No." Moreover, because the configuration data 696 indicates that string-type input is to be provided for the Number input parameter, the UI element 622 is set to be a control that is operable to receive such input (e.g., a text box).

The Number attribute 662 in the context associated with the controller 615 can be used by the pattern component 600 to store input data provided by an end-user in the UI element 622. As with the type of the Number UI element 622, the type of the Number attribute 662 can be set based on the data type indicated in the configuration data 696 (in this case, a "string" type). The coupling between the Number UI element 622 and the Number attribute 662 can be enabled by binding the Number UI element 622 and the Number attribute 662. Bindings between other types of entities can also be created—for example, a context attribute (e.g., the Number attribute 662) can be bound to a model entity (e.g., the Number parameter 677 in the input structure 675 of the query object 670). Such a binding, known as a model binding, generally serves to couple an item with a model entity that represents an abstraction of business logic in a back-end system.

Similar entities (e.g., UI elements, data structure elements, and bindings) can be generated for the other two input parameters (Name and City) specified in the section of configuration data 694. In addition, many other types of entities can be generated based on the configuration data specified by an application developer. Such entities can be used by a pattern component for purposes of navigation and for other UI-related issues. For example, various entities can be generated for purposes of implementing advanced UI functionality, such as input help and input validation.

The use of configuration data to generate execution-related entities for a pattern component can be carried out at various times, including, for example, in a pre-execution step (e.g., after the configuration data has been specified), when the pattern component or application is loaded into a runtime system or otherwise launched, or during execution of the pattern component or application. In one implementation, the entities are generated on an on-demand basis as they are needed. For instance, in the preceding example, the Number UI element 622 can be generated when the view 610 is first displayed, or even when the Number UI element 622 first becomes visible (e.g., when the end-user exposes an "advanced search" form in the view 610).

Example Configuration Data

To configure a UI pattern (e.g., as in the example configuration described above), a developer can associate the pattern with a specific back-end system and the entities (e.g., queries, input structure, input parameters, input fields, result structure, and/or result fields) available within that back-end system. As described above, such an association can be specified as configuration data stored in a configuration repository or in one or more configuration files. The application developer can use a configuration application that assists him in selecting a back-end system, determining which parameters and other entities exist in the back-end system, selecting an appropriate set of those entities for an application, and specifying all such selections as formatted configuration data (e.g., in a formatted configuration file).

In one implementation, the configuration application uses an interface layer that provides a generic interface to back-end systems. An example of such an interface layer is the interface layer in the Enterprise Service Framework (ESF) developed by SAP. The interface layer includes a repository with meta data corresponding to the back-end data.

Using the example in FIG. 6B, the back-end specific model 665 can be stored as meta data in the meta data repository of an interface layer. The application developer can determine from this meta data that the customer query 670 (defined by the back-end system) is one used to find customer objects. The meta data repository further includes the parameters 675 of the input to the query, namely a number, a name, and a city. The configuration application enables the application developer to select any combination of input parameters 675 that is to be presented in drop down element 640 when view 610 is rendered. The application developer can also select which of the fields in result structure 680 are to be displayed when result objects are returned from the back-end system in response to a query.

An example of configuration data that defines the search portion of a specific application (i.e., that specifies a configuration for a search pattern) is shown below:

```
<?xml version="1.0" encoding="UTF-8" ?>
<SearchView Caption="Customer Search">
  <Query Service Module="Customer" Query="CustomerQuery">
    <QueryParameters>
      <Number Label="Customer No." Type="string"/>
      <Name Label="Last Name" Type="string"/>
```

-continued

```
    <City Label="City" Type="string"/>
  </QueryParameters>
 </Query>
</SearchView>
```

In this example, the configuration data is represented using XML. Taking the data in order, the first line defines the version and encoding of the XML file. The next line defines the caption that is inserted into the generic caption text 635 of pattern view 610. As indicated, the application associated with this configuration displays "Customer Search" in the title bar to orient the user that he or she is searching for customers. The next line specifies that the query to be executed for this application is the "CustomerQuery" query within the "Customer" service module in the back-end system.

The next five lines specify the input parameters selected by the application developer to be included in drop down element 640. As indicated in the data, the application developer has selected all three of the available input parameters 675, namely "Number", "Name", and "City". Further, the application developer has defined more user-friendly labels for each of the parameters. The configuration data also defines the data type for each of the parameters, so view 610 can provide an appropriate control for each selected field. For example, in an advanced search view, a checkbox can be provided for a Boolean type input parameter, rather than the text entry box that is typically used for string type input parameters.

Although an application developer can generate configuration data directly, the use of a configuration application can advantageously enforce the required schema for the configuration data, so as to ensure that the configuration data is successfully merged with a generic pattern component to generate a specific application.

Figure 7:
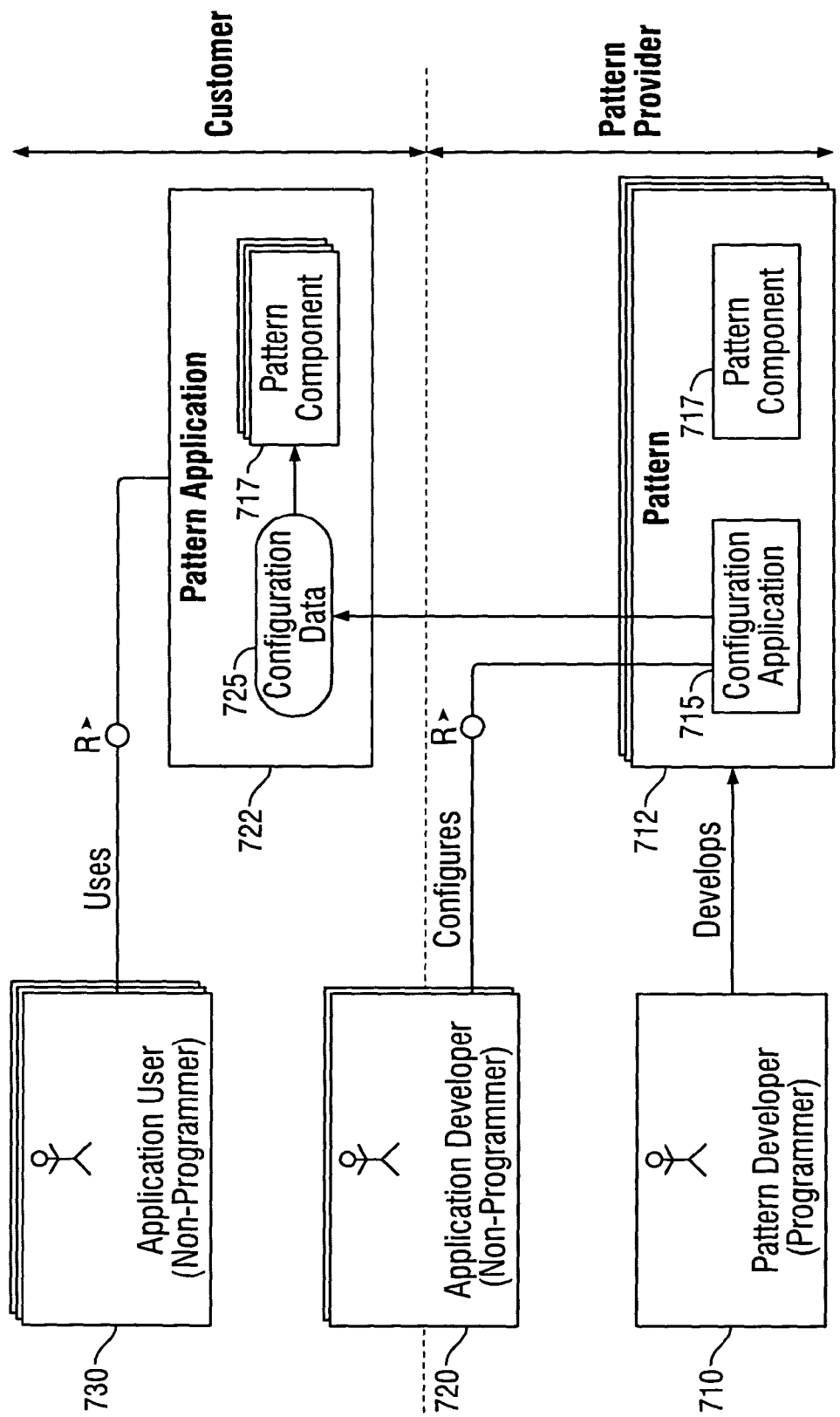
FIG. 7 is a block diagram of a configurable pattern component for a search pattern.

FIG. 7 illustrates example roles and functions that can be involved in the process of developing, configuring, and using pattern-based applications. The process begins with the development of pattern 712, which can include the development of a pattern or execution component 717, and a corresponding configuration application 715 that is used to produce configuration data 725 for the pattern component 717. Multiple levels of patterns, and multiple patterns within each level, can be developed. The top level can include different floor plans for different types of business processes. The development of patterns can be carried out by a pattern developer 710 in a pattern-providing organization ("pattern provider"). Pattern developers are typically skilled programmers.

To create a specific application 722 for a specific type of business process, an application developer 720 can configure a floor plan pattern that corresponds to that type of business process (as well as possibly one or more nested patterns). In the implementation shown in FIG. 7, the process of configuring a pattern involves the use of a configuration application 715 to create configuration data 725 for a corresponding pattern component 717. The configuration application 715 can be designed to be very simple to use—e.g., it can be designed to let an application developer configure a pattern by simply choosing among multiple alternatives for each required piece of configuration data. Accordingly, application developers need not have programming skills—rather, they can be non-technical people, such as program managers or business executives who are experts in a particular application or business area.

Multiple application development scenarios are possible. For example, patterns can be delivered by a pattern provider to a customer either with or without corresponding configurations. In the former scenario, an application developer on the pattern provider side configures a pattern and delivers a fully-configured pattern-based application 722 that is ready to be used by an application end-user 730 on the customer side. In the latter scenario, the pattern provider delivers only the patterns (e.g., the configuration applications and the pattern components) to the customer, and an application developer on the customer side creates a pattern application 722 by configuring one or more of the patterns. As another possible scenario, an application developer on the pattern provider side can create and deliver pre-configured applications, which can either be used directly by an end-user, or further adapted by an application developer on the customer side (e.g., by modifying the delivered configurations) in order to meet the specific needs of the customer.

Testing Pattern-Based Applications

Figure 8:
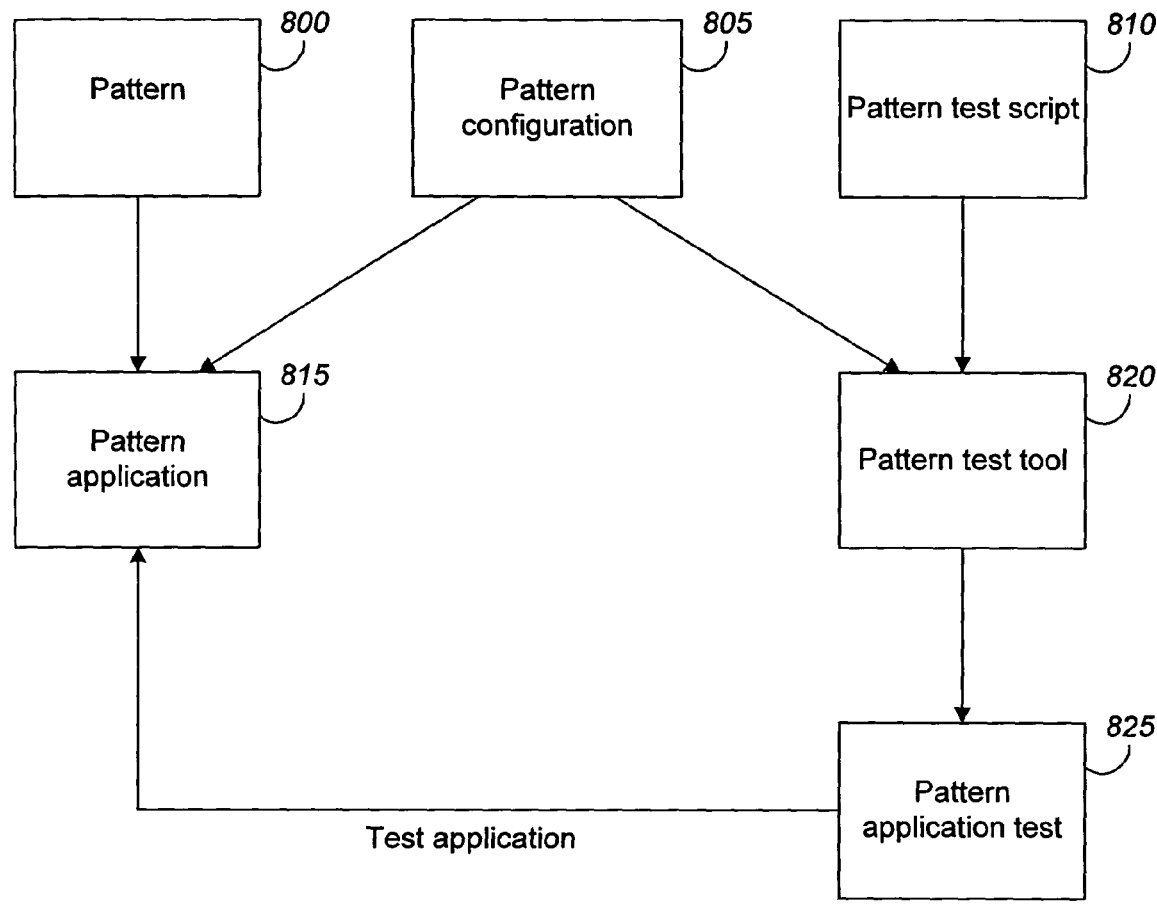
FIG. 8 is a block diagram of a development environment using a pattern test script and a pattern test tool to generate a test sequence for a pattern application.

FIG. 8 is a block diagram of a testing environment for pattern-based applications. As described above, an application developer generates a pattern-based application 815 by specifying a pattern configuration 805 for a pattern 800 used by the application 815. In one implementation, this involves the use of a configuration application to generate configuration data for a pattern, which includes one or more UI controls, e.g., buttons, menus, and other UI controls that can accept user input. The pattern 800 and the corresponding pattern configuration 805 are required to execute the pattern application 815.

The testing environment shown in FIG. 8 includes a pattern test script 810 for the pattern 800 used by the pattern application 815. A pattern test tool 820 uses the pattern test script 810 and the pattern configuration 805 to generate a pattern application test 825 that is used to test the pattern application 815. Generating the pattern application test 825 can include generating test data required by the pattern application test 825. In one implementation, the pattern application test 825 is an application-specific test script that can be used to test the pattern application. Alternatively, the pattern application test can be a series of test sequences or function calls that are executed directly by the pattern test tool 820.

The pattern test script 810 knows what functionality is implemented by the corresponding pattern 800, and includes the logic required to test that functionality as configured in pattern applications 815. The pattern test script 810 can encapsulate data and instructions or commands to test the functions implemented by the pattern 800 in one or more user interface environments. The pattern application test 825 can test the pattern application 815 by testing each pattern 800 used by the pattern application and configured according to a corresponding pattern configuration. The pattern application test 825 can test the pattern application 815 using one or more layers of the framework 500 (FIG. 5), e.g., the generic pattern layer 530, the platform independent component development and runtime layer 520, and the platform layer 510.

The pattern application 815 can include a hierarchical arrangement of one or more patterns. Each pattern 800 can have an associated configuration application, and a pattern configuration 805 can be created for each pattern 800 using the associated configuration application. The pattern configurations 805 for the patterns 800 used by the pattern application 815 can be stored in the configuration repository.

Figure 9:
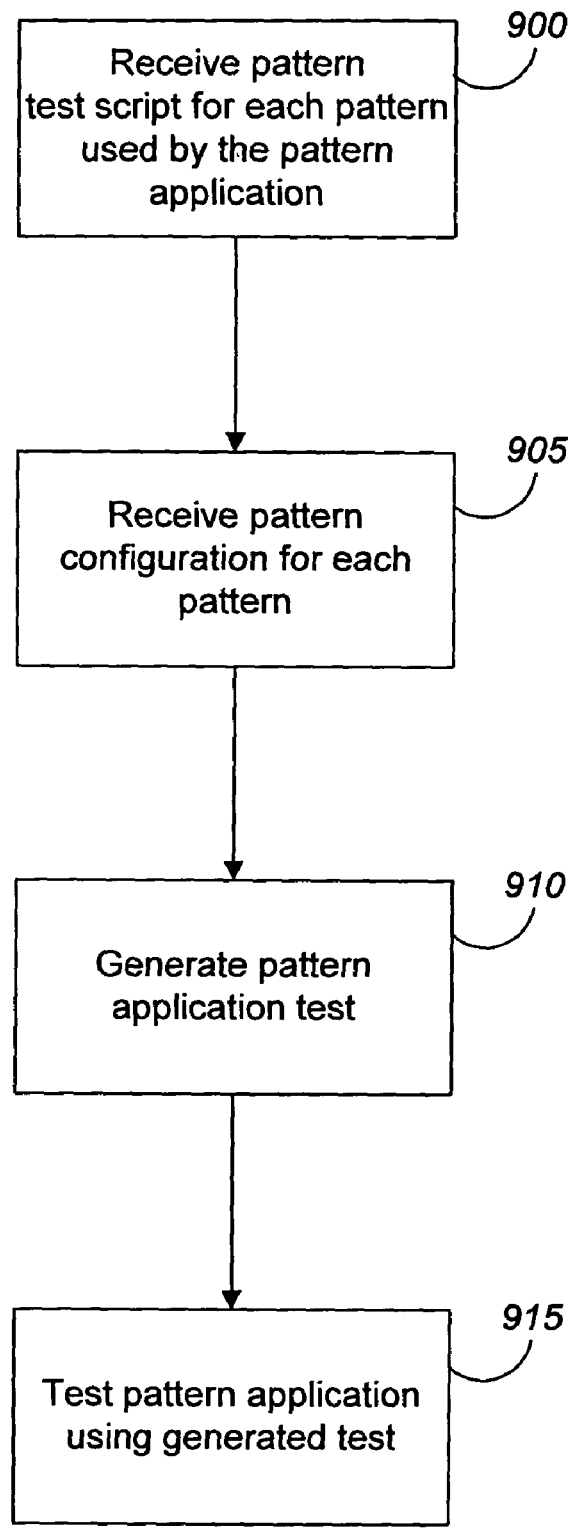
FIG. 9 is a flow diagram illustrating a process for testing a pattern application.

FIG. 9 is a flow diagram illustrating a process for testing a pattern application 815. A pattern test script 810 is received for each pattern 800 used by the pattern application 815 (step 900). In addition, the pattern configurations 805 are received for each pattern 800 used by the application 815 (step 905). The pattern test scripts 810 and the pattern configurations 805 are used by the pattern test tool 820 to generate the pattern application test 825 (step 910). The pattern application 815 is tested using the generated pattern application test 825 (step 915).

Figure 10:
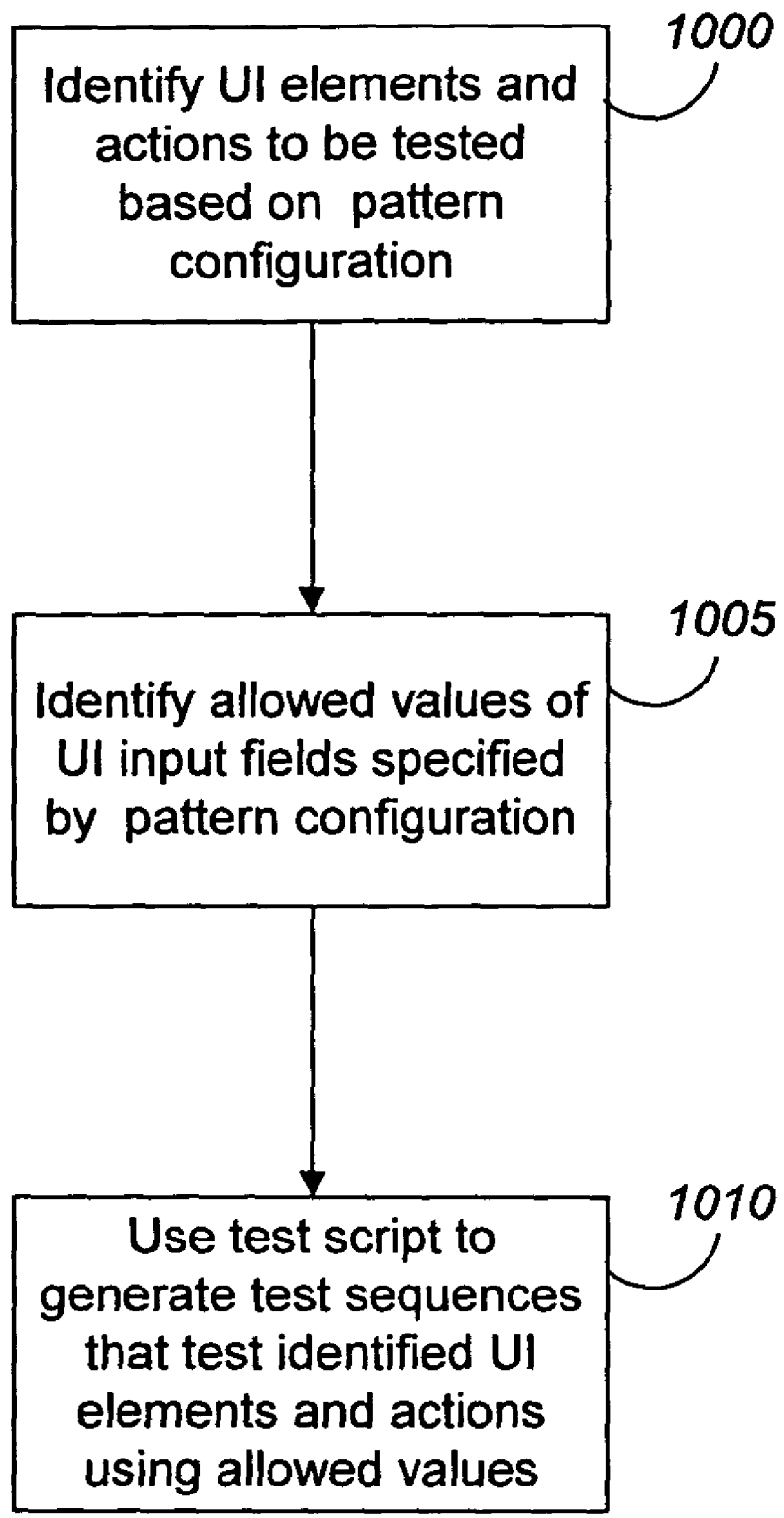
FIG. 10 is a flow diagram illustrating a process for generating a test sequence for a pattern application.

FIG. 10 is a flow diagram illustrating a process for generating a test sequence for the pattern application 815 in step 910. For each pattern 800 used by the pattern application 815, the pattern configuration 805 is used to identify UI elements and actions that are to be tested (step 1000). For example, if the application developer configures the pattern 800 so that certain specified UI elements are not used by the configured pattern 800 in the pattern application 815, the pattern application test 825 does not include test sequences to test the unused UI elements of the pattern 800. In an alternative example, the pattern application test 825 can also test whether the unused UI elements have been properly deactivated in the pattern application 815. In addition, for UI input fields, the pattern configuration 805 is used to identify allowed values of UI input fields for the configured pattern 800 used by the pattern application 815 (step 1005). For example, if a UI input field in the pattern 800 can accept a wider range of values than the range of values specified by the application developer, the pattern application test 825 only tests the UI input field for the limited range of values specified by the application developer. In an alternative example, the pattern application test 825 can also test how the pattern application 815 reacts to UI input field values that are outside the limited range of values. The UI elements and actions identified in step 1000 and the specified range of values for the UI input fields identified in step 1005, are used to generate test sequences that test the UI elements and actions of the pattern 800 in the pattern application 815 (step 1010).

Figure 11:
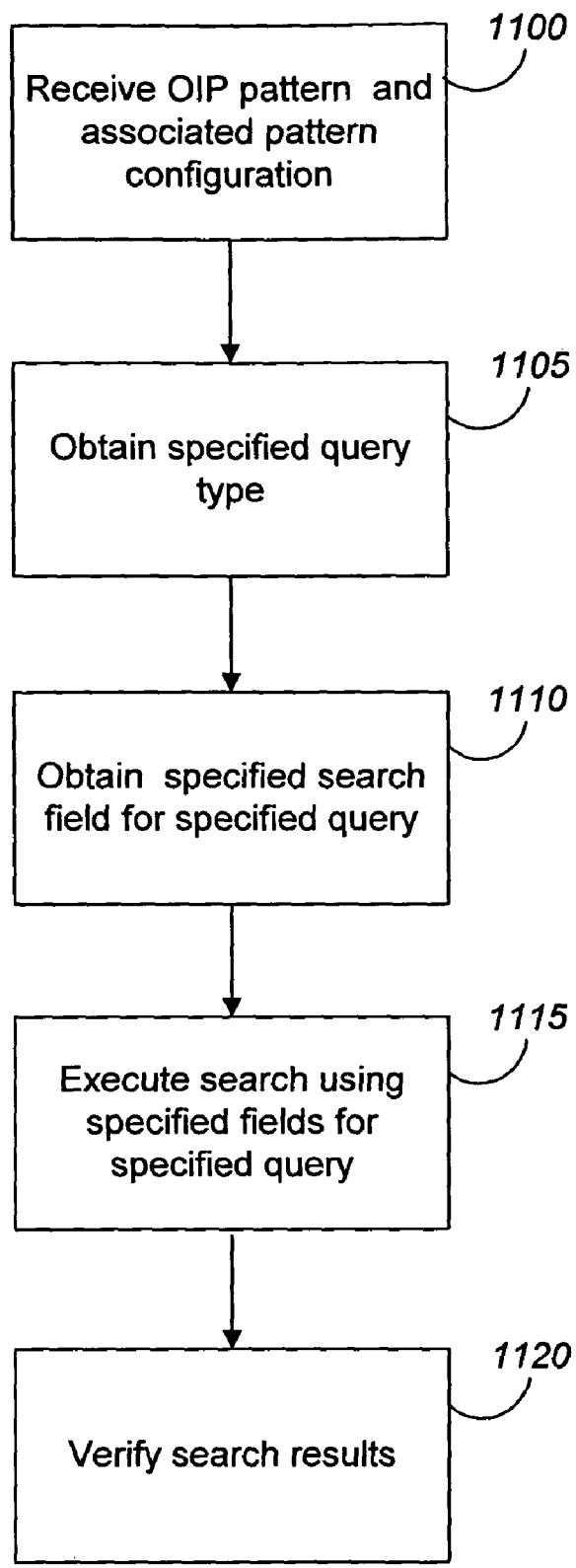
FIG. 11 is a flow diagram illustrating a process for generating a test sequence for a pattern application that uses an object identification pattern (OIP).

FIG. 11 is a flow diagram illustrating a process for generating a test sequence for a pattern application 815 that uses an object identification pattern (OIP). The OIP pattern and associated configuration data for the pattern application 815 using the OIP pattern are received (step 1100). As described previously, an OIP pattern can include a search bar at the top of a view. The end user can select a search field from a drop down box in the search bar, type in a query in a UI input field (e.g., a text field), and click on a "go" button to initiate a search. The configuration for the OIP pattern can specify a query (selected from a list of available queries), and a list of fields that the query can be invoked with (i.e., the choices listed in the drop down box for the search field). The specified query is obtained from the pattern configuration 805 (step 1105). In addition, the specified search fields for the specified query are also obtained from the pattern configuration 805 (step 1110). The pattern test tool 820 generates a test sequence for the OIP pattern component using the pattern test script 810 and the pattern configuration 805. The generated test sequence executes a search using the specified search fields for the specified query to test the OIP pattern (step 1115), and verifies the search results (step 1120). In one implementation, the pattern test script 810 corresponding to the OIP pattern loops through all the specified search fields and executes a generic search in the pattern application (e.g., as if a "*" or other wildcard character had been entered as the query string) for each search field.

In one implementation, the pattern test script 810 verifies the search results by counting the number of results returned to the pattern application 815, and ensuring that the pattern application 815 displays all the search results. In an alternative implementation, the OIP pattern test script verifies that each search result returned to the pattern application 815 can be selected, and that the selected search result is appropriately highlighted. If the pattern application includes an ODP pattern that displays the selected search result, the test script can verify that the tab strips and fields displayed by the ODP pattern match the corresponding pattern configuration 805.

Figure 12:
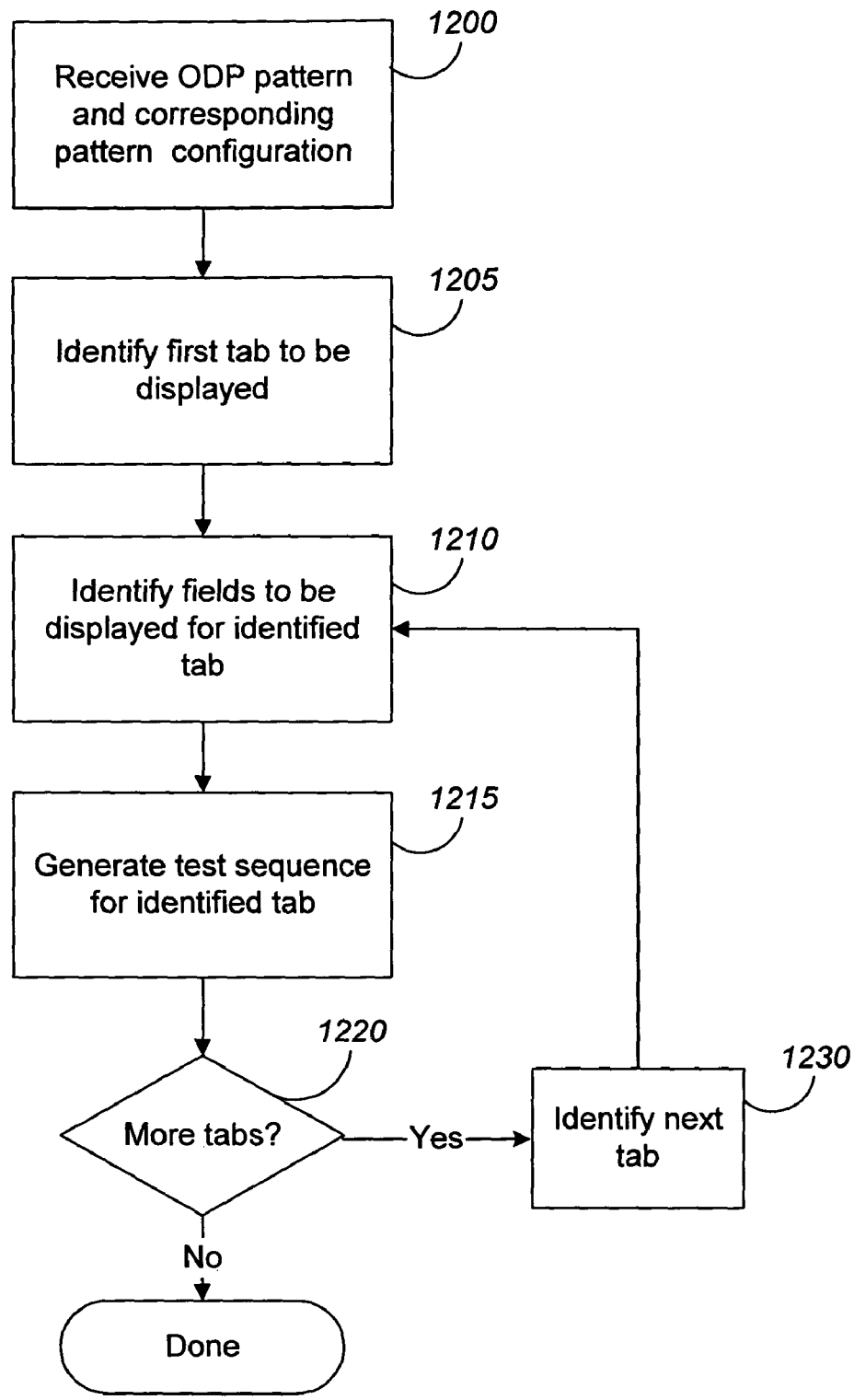
FIG. 12 is a flow diagram illustrating a process for generating a test sequence for a pattern application that uses an object data pattern (ODP).

FIG. 12 is a flow diagram illustrating a process for generating a pattern application test 825 for a pattern application 815 that uses an object data pattern (ODP). The ODP pattern and a pattern configuration 805 for the ODP pattern are received (step 1200). The pattern configuration 805 includes a specification of the tabs and fields that are to be displayed for an object displayed in the ODP pattern. In one implementation, the pattern test script 810 for the ODP pattern selects each of the specified tabs specified by the pattern configuration 805 and attempts to enter data in each field under each specified tab. The pattern configuration 805 is used to identify a first tab to be displayed (step 1205), and to identify fields to be displayed for the identified tab (step 1210). A test sequence is generated for the identified tab (step 1215). In one implementation, the generated test sequence can include entering data for each identified field for the identified tab. If there are no additional tabs ("no" branch of decision step 1220), the generation of the test sequence for the ODP pattern is complete. If there are additional tabs in the ODP pattern ("yes" branch of decision step 1220), the next tab to be tested is identified (step 1230) and control returns to step 1210.

Figure 13:
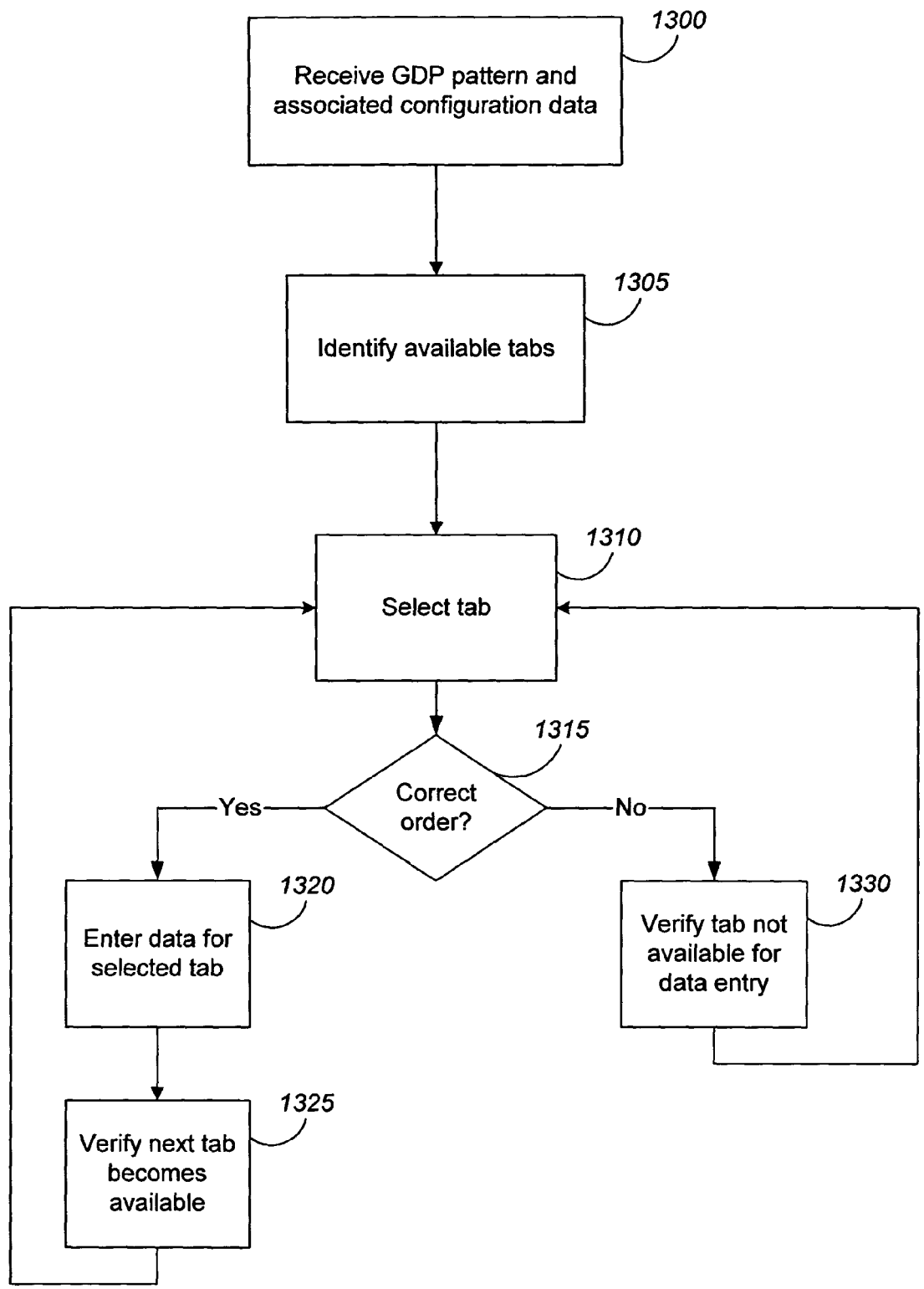
FIG. 13 is a flow diagram illustrating a process for generating a test sequence for a pattern application that uses a guided data entry pattern (GDP).

FIG. 13 is a flow diagram illustrating a process for generating a pattern application test 825 for a pattern application 815 that uses a guided data entry pattern (GDP). As described above, a GDP pattern can include a sequence of tabs for which a user is required to enter data in a specified correct order. Depending on the configuration a subsequent tab in the sequence of tabs becomes available for data entry only after data entry for a current tab is complete. In one implementation, the pattern test script 810 for the GDP pattern verifies that the tabs cannot be selected out of order and are not available for data entry. The GDP pattern and corresponding pattern configuration 805 are received (step 1300), and available tabs for the GDP pattern are identified based on the pattern configuration 805 (step 1305). One of the identified tabs in step 1305 is selected (step 1310). If the selected tab is in the correct order as specified by the GDP pattern ("yes" branch of decision step 1315), data is entered for the selected tab (step 1320), and the test sequence verifies that the next tab becomes available (step 1325). Control then returns to step 1310. If the selected tab is not selected in the correct order ("no" branch of decision step 1315), the test sequence verifies that the tab is not available for data entry (step 1330), and control returns to step 1310.

The invention can be implemented in digital electronic circuitry, or in computer hardware, firmware, software, or in combinations of them. The invention can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

The invention can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the invention, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The invention has been described in terms of particular embodiments, but other embodiments can be implemented and are within the scope of the following claims. For example, the operations of the invention can be performed in a different order and still achieve desirable results. In certain implementations, multitasking and parallel processing may be preferable. As another example, although the use of UI patterns has been described in connection with business objects and business data, patterns can be used with other types of objects and with data that is not business-related.

Patterns can also be developed using different development processes in different development environments, and executed in different run-time systems. For example, patterns can be developed using an integrated development environment (IDE) that incorporates tools for building, testing, deploying, and maintaining applications (e.g., configuration applications and pattern components). Such tools can include visual development tools, templates (e.g., code templates), and class libraries. A class library can include base classes that provide basic functionality (e.g., input/output, string manipulation, and network communication), as well as specialized classes that provide enhanced functionality (e.g., classes for building and using graphical user interfaces on clients, and for offloading application functionality onto smart clients). Where an IDE supports multiple languages, class libraries can provide a consistent development interface across those languages.

In addition, some IDEs also provide services and functionality that can be used to reduce the amount of code that needs to be written manually. Such functionality can include, for example, the ability to declare and bind to data types, and the ability to bind application elements such as controls and data structures.

IDEs can also provide code generation capabilities—for example, the ability to automatically generate plumbing code (e.g., code for drawing windows or accessing Web services), or the ability to automatically generate run-time code (e.g., by using code generators, compilers, or both). The automatic generation of run-time code allows programs to be targeted to multiple platforms. For example, a code generator can be used to automatically generate run-time code for one or more specific platforms based on the program code produced by a developer. Alternatively, the developer code can be compiled for a run-time system, which can be hosted in multiple environments (e.g., servers, clients, or a combination of servers and clients).

Some IDEs also provide the ability to create metadata that specifies descriptive information about an application, and that can be used by a run-time system to provide services to the application. Metadata can be explicitly declared by a developer, generated in the process of generating run-time code, or both.

Examples of IDEs that can be used to develop patterns include IDEs that are built using the open Eclipse Platform supported by the Eclipse Foundation (e.g., the Web Dynpro IDE developed by SAP, or the WebSphere Studio IDE developed by IBM Corp. of Armonk, N.Y.), as well as proprietary IDEs (e.g., the Visual Studio NET IDE developed by Microsoft Corp. of Redmond, Wash.).

The overall process of developing a pattern (including, e.g., developing a configuration application and a pattern component) can include a design time aspect and a run-time aspect. The design time aspect can involve use of the IDE to write code and to declare attributes, bindings, and other metadata. The code and the metadata can then be used to generate run-time code to be executed in a run-time system. Some development environments can be coupled to a corresponding run-time system, which allows programs developed in such development environments to take advantage of services offered by the corresponding run-time systems. For example, in the Web Dynpro environment discussed in conjunction with FIG. 5, applications can take advantage of services such as input help and validation offered by the Web Dynpro runtime, which frees developers from having to code such functionality manually into their programs.

Run-time systems provide a code execution environment that generally includes core services (e.g., memory, process, and session management), as well as enhanced services (e.g., input help and validation). In addition to the Web Dynpro runtime, other examples of run-time systems include virtual machines (e.g., the Java Virtual Machine), and the Common Language Runtime (a run-time system developed by Microsoft Corp.) As specified above, run-time systems can be hosted in multiple environments, including servers and clients. Servers generally provide a core operating environment for applications (e.g., by providing a run-time system in which the applications can execute). An example of a server is a J2EE-compliant server, such as the Web Application Server from SAP or the WebSphere Application Server from IBM Corp.

What is claimed is:

1. A computer program product, tangibly embodied in a storage device, for testing pattern-based applications, the computer program product comprising instructions operable to cause data processing apparatus to:

receive a test script for a pattern, the pattern including a predefined layout of user interface elements and specifying predefined actions that can be performed using the user interface elements, wherein the pattern has a general semantic meaning and is configurable into multiple specific user interfaces, the test script specifying test sequences that invoke, without user interactions, one or more of the predefined actions that can be performed using the user interface elements, wherein the test sequences include test data for testing the multiple specific user interfaces according to the general semantic meaning of the pattern;

receive a specification of an application, wherein the application includes a specific user interface configured from the pattern, the specification of the application comprising application-specific configuration data for the pattern, the application-specific configuration data specifying associations between one or more of the user interface elements and one or more entities in a back-end system configured to process outputs of the one or more user interface elements; and generate an application-specific test based on the test script and the specification of the application, wherein the application-specific test selects, from the test data for testing the multiple specific user interfaces, at least a portion of the test data according to the application-specific configuration data such that the application-specific test invokes, without user interactions, one or more of the predefined actions operating on the entities in the back-end system with which the user interface elements are associated.

2. The computer program product of claim 1, wherein the instructions are further operable to:

test the application by executing the application-specific test.

3. The computer program product of claim 1, wherein:

the pattern includes one or more nested patterns, each nested pattern including a predefined layout of user interface elements on a section of the user interface and specifying predefined actions that can be performed using the user interface elements;

the instructions for receiving the test script comprise instructions to receive one or more distinct test scripts, each distinct test script corresponding to one of the nested patterns;

the instructions for receiving the specification of the application comprise instructions to receive distinct configuration data for each nested pattern; and the application-specific test is further operable to test each nested pattern as configured by the distinct configuration data according to the distinct test script corresponding to the nested pattern.

4. The computer program product of claim 1, wherein the instructions are further operable to:

receive a specification of a second application, wherein the second application includes a second specific user interface configured from the pattern, the specification of the second application comprising distinct application-specific configuration data for the pattern, the distinct application-specific configuration data specifying associations between one or more of the user interface elements and one or more entities in a second back-end system; and generate a second application-specific test based on the test script and the specification of the application, wherein the second application-specific test selects, from the test data for testing the multiple specific user interfaces, a distinct portion of the test data according to the distinct application-specific configuration data such that the application-specific test invokes, without user interactions, one or more of the predefined actions operating on the entities in the back-end system with which the user interface elements are associated.

5. A method comprising:

receiving a test script for a pattern, the pattern including a predefined layout of user interface elements and specifying predefined actions that can be performed using the user interface elements, wherein the pattern has a general semantic meaning and is configurable into multiple specific user interfaces, the test script specifying test sequences that invoke, without user interactions, one or more of the predefined actions that can be performed using the user interface elements, wherein the test sequences include test data for testing the multiple specific user interfaces according to the general semantic meaning of the pattern;

receiving a specification of an application, wherein the application includes a specific user interface configured from the pattern, the specification of the application comprising application-specific configuration data for the pattern, the application-specific configuration data specifying associations between one or more of the user interface elements and one or more entities in a back-end system configured to process outputs of the one or more user interface elements; and generating an application-specific test based on the test script and the specification of the application, wherein the application-specific test selects, from the test data for testing the multiple specific user interfaces, at least a portion of the test data according to the application-specific configuration data such that the application-specific test invokes, without user interactions, one or more of the predefined actions operating on the entities in the back-end system with which the user interface elements are associated.

6. The method of claim 5, further comprising:

testing the application by executing the application-specific test.

7. The method of claim 5, wherein:

the pattern includes one or more nested patterns, each nested pattern including a predefined layout of user interface elements on a section of the user interface and specifying predefined actions that can be performed using the user interface elements;

receiving the test script comprises receiving one or more distinct test scripts, each distinct test script corresponding to one of the nested patterns;

receiving the specification of the application comprises receiving distinct configuration data for each nested pattern; and the application-specific test is further operable to test each nested pattern as configured by the distinct configuration data according to the distinct test script corresponding to the nested pattern.

8. The method of claim 5, further comprising:
receiving a specification of a second application, wherein the second application includes a second specific user interface configured from the pattern, the specification of the second application comprising distinct application-specific configuration data for the pattern, the distinct application-specific configuration data specifying associations between one or more of the user interface elements and one or more entities in a second back-end system; and
generating a second application-specific test based on the test script and the specification of the application, wherein the second application-specific test selects, from the test data for testing the multiple specific user interfaces, a distinct portion of the test data according to the distinct application-specific configuration data such that the application-specific test invokes, without user interactions, one or more of the predefined actions operating on the entities in the back-end system with which the user interface elements are associated.

9. A system comprising:
means for receiving a test script for a pattern, the pattern including a predefined layout of user interface elements and specifying predefined actions that can be performed using the user interface elements, wherein the pattern has a general semantic meaning and is configurable into multiple specific user interfaces, the test script specifying test sequences that invoke, without user interactions, one or more of the predefined actions that can be performed using the user interface elements, wherein the test sequences include test data for testing the multiple specific user interfaces according to the general semantic meaning of the pattern;
means for receiving a specification of an application, wherein the application includes a specific user interface configured from the pattern, the specification of the application comprising application-specific configuration data for the pattern, the application-specific configuration data specifying associations between one or more of the user interface elements and one or more entities in a back-end system configured to process outputs of the one or more user interface elements; and
means for generating an application-specific test based on the test script and the specification of the application, wherein the application-specific test selects, from the test data for testing the multiple specific user interfaces, a portion of test data from the set of predetermined test data according to the application-specific configuration data such that the application-specific test invokes, without user interactions, one or more of the predefined actions operating on the entities in the back-end system with which the user interface elements are associated.

10. The system of claim 9, further comprising:
means for testing the application by executing the application-specific test.

11. The system of claim 9, further comprising:
means for receiving a specification of a second application, wherein the second application includes a second specific user interface configured from the pattern, the specification of the second application comprising distinct application-specific configuration data for the pattern, the distinct application-specific configuration data specifying associations between one or more of the user interface elements and one or more entities in a second back-end system; and
means for generating a second application-specific test based on the test script and the specification of the application, wherein the second application-specific test selects, from the test data for testing the multiple specific user interfaces, a portion of test data from the set of predetermined test data according to the application-specific configuration data such that the application-specific test invokes, without user interactions, one or more of the predefined actions operating on the entities in the back-end system with which the user interface elements are associated.

* * * * *